US008887222B2

(12) United States Patent
Huang et al.

(10) Patent No.: US 8,887,222 B2
(45) Date of Patent: Nov. 11, 2014

(54) MULTICASTING IN A WIRELESS DISPLAY SYSTEM

(75) Inventors: Xiaolong Huang, San Diego, CA (US); Vijayalakshmi R. Raveendran, San Diego, CA (US); Doo Seok Kim, San Diego, CA (US); Fawad Shaukat, San Diego, CA (US); Xiaodong Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 9 days.

(21) Appl. No.: 13/482,092

(22) Filed: May 29, 2012

(65) Prior Publication Data

US 2013/0139210 A1     May 30, 2013

Related U.S. Application Data

(60) Provisional application No. 61/534,742, filed on Sep. 14, 2011, provisional application No. 61/547,240, filed on Oct. 14, 2011.

(51) Int. Cl.

| | |
|---|---|
| *H04N 7/173* | (2011.01) |
| *H04W 4/06* | (2009.01) |
| *H04L 29/06* | (2006.01) |
| *H04N 21/6405* | (2011.01) |
| *H04L 12/18* | (2006.01) |

(52) U.S. Cl.
CPC .............. *H04N 21/6405* (2013.01); *H04W 4/06* (2013.01); *H04L 65/4076* (2013.01); *H04L 12/189* (2013.01); *H04L 12/185* (2013.01)
USPC .......................................... 725/109; 725/110

(58) Field of Classification Search
CPC ............ H04N 21/64; H04N 29/06455; H04N 29/12009

USPC .................................................. 725/109, 110
See application file for complete search history.

(56) References Cited

U.S. PATENT DOCUMENTS 6,567,929 B1 *   5/2003   Bhagavath et al. ............. 714/18
7,106,735 B2     9/2006   Yagyu et al.
(Continued)

FOREIGN PATENT DOCUMENTS

EP          2139159 A1    12/2009

OTHER PUBLICATIONS

International Search Report and Written Opinion—PCT/US2012/055219—ISA/EPO—Dec. 12, 2012.

(Continued)

*Primary Examiner* — Pankaj Kumar
*Assistant Examiner* — Franklin Andramuno
(74) *Attorney, Agent, or Firm* — Donald C. Kordich

(57) ABSTRACT

This disclosure relates to techniques to establish a multicast communication session between a source device and multiple sink devices in a Wireless Display (WD) system. Two or more sink devices may be interested in receiving the same media data from the source device. According to the techniques, the source device establishes a multicast session with the sink devices in the WD system, and sends a single copy of multicast media data for the multicast session to the interested sink devices using a receiving multicast port. The source device selects a receiving multicast port number as a destination identifier for each multicast session. The sink devices interested in receiving the media data of a given multicast session bind on the receiving multicast port for the multicast session. This disclosure describes several exemplary multicast subscription procedures to ensure correct binding on the receiving multicast port at each of the sink devices.

38 Claims, 11 Drawing Sheets

(56) References Cited

U.S. PATENT DOCUMENTS

| | | | |
|---|---|---|---|
| 7,336,668 B2* | 2/2008 | Adams | 370/396 |
| 2005/0091313 A1* | 4/2005 | Zhou et al. | 709/204 |
| 2010/0241686 A1 | 9/2010 | Deng et al. | |
| 2010/0329172 A1 | 12/2010 | Wu et al. | |
| 2011/0069652 A1 | 3/2011 | Kakani et al. | |
| 2011/0080910 A1 | 4/2011 | Shouno | |

OTHER PUBLICATIONS

Mohamed E.E., et al., "Multicast address management in the internet: A study of the port blocking problem", Computer Systems and Appli cations, 2005. The 3rd ACS/IEEE International Conference on Cairo, Egypt Jan. 3-6, 2005, Piscataway, NJ, USA.IEEE, Jan. 3, 2005, pp. 383-389, XP010777686, DOI: 10.1109/AICCSA.2005.1387068 ISBN: 978-0-7803-8735-5, section 3.

"Wi-Fi Alliance Member Symposium", Apr. 1, 2011, XP055046396, Retrieved from the internet: URL:http://www.wi-fi.org/files/20110421_China_Symposia_full_merge.pdf [retrieved on Dec. 3, 2012], p. 231.

* cited by examiner

MULTICASTING IN A WIRELESS DISPLAY SYSTEM

This application claims the benefit of U.S. Provisional Application No. 61/534,742, filed Sep. 14, 2011, and U.S. Provisional Application No. 61/547,240, filed Oct. 14, 2011, the entire content of each of which is incorporated herein by reference in its entirety.

TECHNICAL FIELD

The disclosure relates to transmitting data between a wireless source device and a wireless sink device.

BACKGROUND

Wireless display (WD) systems include a source device and one or more sink devices. The source device and each of the sink devices may be either mobile devices or wired devices with wireless communication capabilities. As mobile devices, for example, one or more of the source device and the sink devices may comprise mobile telephones, portable computers with wireless communication cards, personal digital assistants (PDAs), portable media players, or other flash memory devices with wireless communication capabilities, including so-called "smart" phones and "smart" pads or tablets, or other types of wireless communication devices. As wired devices, for example, one or more of the source device and the sink devices may comprise televisions, desktop computers, monitors, projectors, and the like, that include wireless communication capabilities.

The source device sends media data, such as audio and/or video data, to one or more of the sink devices participating in a particular communication session. The media data may be played back at both a local display of the source device and at each of the displays of the sink devices. More specifically, each of the participating sink devices renders the received media data on its display and audio equipment. In some cases, a user of a sink device may apply user inputs to the sink device, such as touch inputs and remote control inputs. In the WD system, the user inputs are sent from the sink device to the source device. The source device processes the received user inputs from the sink device and applies the effect of the user inputs on subsequent media data sent to the sink device.

SUMMARY

In general, this disclosure relates to techniques to establish a multicast communication session between a source device and multiple sink devices in a Wireless Display (WD) system. In some circumstances, two or more sink devices may be interested in receiving the same media data, e.g., audio and/or video (A/V) data, from the source device. Conventionally, the source device establishes a unicast session with each of the sink devices, and sends a separate copy of the same media data to each of the interested sink devices on a receiving port for the particular sink device. According to the techniques of this disclosure, the source device establishes a multicast session with the sink devices in the WD system, and sends a single copy of multicast media data for the multicast session to the interested sink devices using a multicast address and a receiving multicast port.

More specifically, in order to provide multicasting in the WD system, the source device selects a multicast Internet Protocol (IP) address and a receiving multicast port number as a destination identifier for each multicast session. The sink devices interested in receiving the media data of a given multicast session bind on the multicast IP address and receiving multicast port associated with the multicast session. The source device broadcasts the media data of the multicast group to all the sink devices in the WD system. The interested sink devices that are bound on the multicast IP address and the receiving multicast port associated with the multicast session will receive and process the media data. This disclosure describes several exemplary multicast subscription procedures to ensure correct binding on the multicast address and receiving multicast port at each of the sink devices.

In one example, a method comprises establishing one or more multicast communication sessions between a source device and two or more sink devices in a WD system, including advertising availability of multicast media data for the multicast sessions and receiving requests from the sink devices to join the multicast sessions, selecting, with the source device, a receiving multicast port number for each of the multicast sessions, and sending a single copy of the multicast media data for each of the multicast sessions to the sink devices using the selected receiving multicast port number.

In another example, a method comprises establishing, with a sink device, one or more multicast communication sessions with a source device in a WD system, including receiving advertisements of multicast media data for the multicast sessions from the source device and sending requests to the source device to join one or more of the multicast sessions, binding, with the sink device, on a selected receiving multicast port number for one of the multicast sessions in which the sink device is interested in joining, and receiving, with the sink device, a copy of the multicast media data for the one of the multicast sessions on the selected receiving multicast port number to which the sink device is bound.

In a further example, a source device a memory that stores media data, and a processor configured to establish one or more multicast communication sessions between a source device and two or more sink devices in a WD system, including advertising availability of multicast media data for the multicast sessions and receiving requests from the sink devices to join the multicast sessions, select a receiving multicast port number for each of the multicast sessions, and send a single copy of the multicast media data for each of the multicast sessions to the sink devices using the selected receiving multicast port number.

In another example, a sink device comprises a memory that stores media data, and a processor configured to establish one or more multicast communication sessions with a source device in a WD system, including receiving advertisements of multicast media data for the multicast sessions from the source device and sending requests to the source device to join one or more of the multicast sessions, bind on a selected receiving multicast port number for one of the multicast sessions in which the sink device is interested in joining, and receive a copy of the multicast media data for the one of the multicast sessions on the selected receiving multicast port number to which the sink device is bound.

In a further example, a source device comprises means for establishing one or more multicast communication sessions between a source device and two or more sink devices in a WD system, including advertising availability of multicast media data for the multicast sessions and receiving requests from the sink devices to join the multicast sessions, means for selecting a receiving multicast port number for each of the multicast sessions, and means for sending a single copy of the multicast media data for each of the multicast sessions to the sink devices using the selected receiving multicast port number.

In an additional example, a sink device comprises means for establishing one or more multicast communication sessions with a source device in a WD system, including receiving advertisements of multicast media data for the multicast sessions from the source device and sending requests to the source device to join one or more of the multicast sessions, means for binding on a selected receiving multicast port number for one of the multicast sessions in which the sink device is interested in joining, and means for receiving a copy of the multicast media data for the one of the multicast sessions on the selected receiving multicast port number to which the sink device is bound.

In another example, a computer-readable medium comprises instructions that when executed in a source device cause a programmable processor to establish one or more multicast communication sessions between the source device and two or more sink devices in a WD system, including advertising availability of multicast media data for the multicast sessions and receiving requests from the sink devices to join the multicast sessions, select, with the source device, a receiving multicast port number for each of the multicast sessions, and send a single copy of the multicast media data for each of the multicast sessions to the sink devices using the selected receiving multicast port number.

In a further example, a computer-readable medium comprises instructions that when executed in a sink device cause a programmable processor to establish, with the sink device, one or more multicast communication sessions with a source device in a WD system, including receiving advertisements of multicast media data for the multicast sessions from the source device and sending requests to the source device to join one or more of the multicast sessions, bind, with the sink device, on a selected receiving multicast port number for one of the multicast sessions in which the sink device is interested in joining, and receive, with the sink device, a copy of the multicast media data for the one of the multicast sessions on the selected receiving multicast port number to which the sink device is bound.

The details of one or more examples of the disclosure are set forth in the accompanying drawings and the description below. Other features, objects, and advantages will be apparent from the description and drawings, and from the claims.

DETAILED DESCRIPTION

Figure 1A:
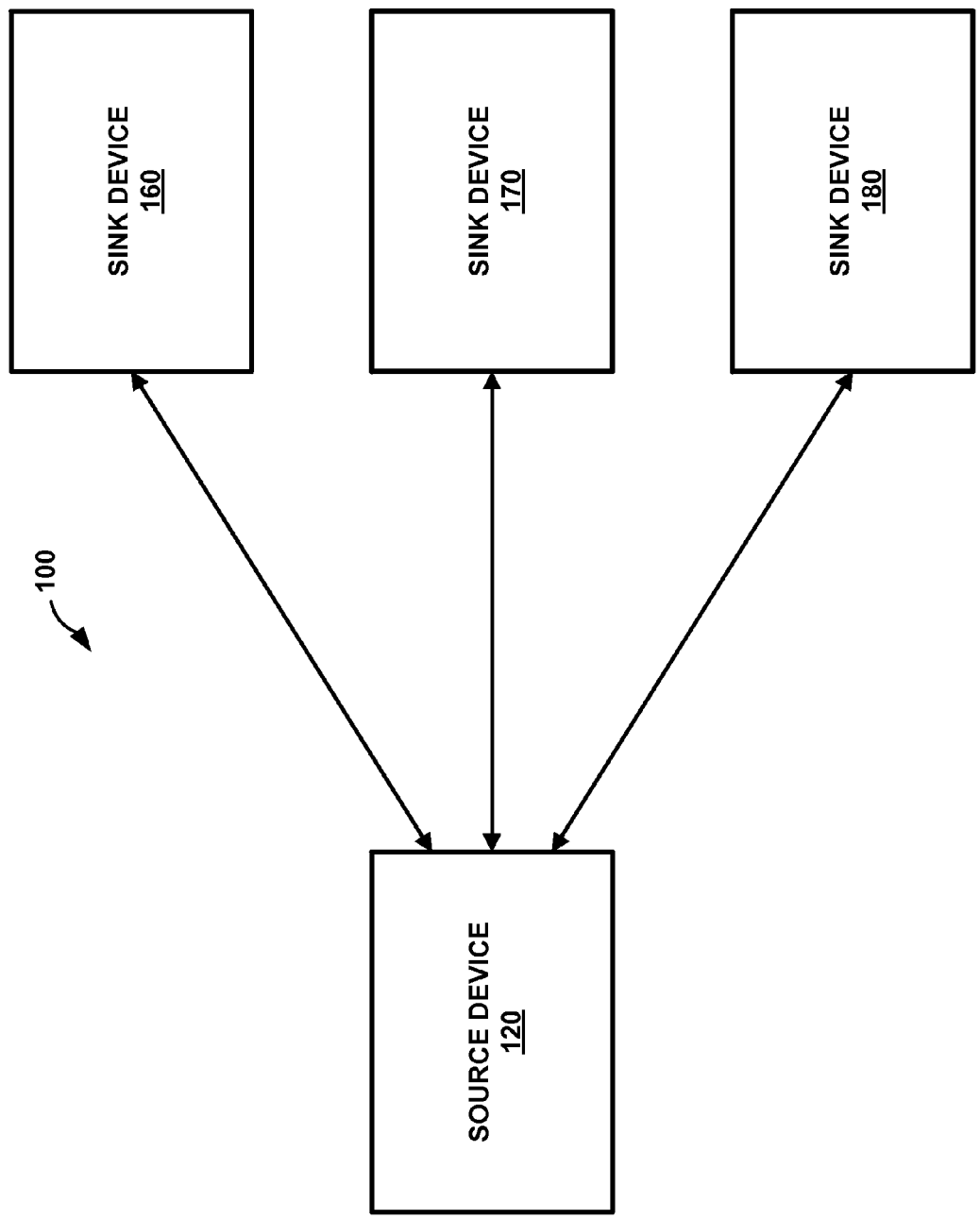
FIG. 1A is a block diagram illustrating an example of a Wireless Display (WD) system including a source device and multiple sink devices capable of supporting a multicast communication session.

FIG. 1A is a block diagram illustrating an example of a Wireless Display (WD) system 100 including a source device 120 and multiple sink devices 160, 170 and 180 capable of supporting a multicast communication session. In WD system 100, source device 120 sends media data, such as audio and/or video data (A/V data), to each of sink devices 160, 170 and 180 participating in a communication session. The media data may be played back at both a local display of source device 120 and local displays of each of the participating sink devices 160, 170 and 180.

In some cases, sink devices 160, 170 and 180 may be interested in receiving the same media data from source device 120. Conventionally, source device 120 establishes a unicast session with each of sink devices 160, 170 and 180. In the case of a unicast session, each of sink devices 160, 170 and 180 identifies an available receiving port at the sink device to which source device 120 may send media data for the unicast session. Source device 120 then sends separate copies of the same media data to the identified receiving ports of the interested sink devices 160, 170 and 180.

When sink devices 160, 170 and 180 are interested in receiving the same media data, however, it is more efficient to send a single copy of the media data that may be received by all the interested sink devices 160, 170 and 180. The techniques of this disclosure enable multicasting in WD system 100. According to the techniques, source device 120 establishes a multicast communication session with two of more of sink devices 160, 170 and 180, and sends a single copy of the media data for the multicast session to a single receiving multicast port available at all the interested sink devices 160, 170 and/or 180.

In exemplary WD system 100 illustrated in FIG. 1A, source device 120 and sink devices 160, 170 and 180 may form a Wi-Fi peer-to-peer (P2P) group with source device 120 as the group owner. In this way, source device 120 and sink devices 160, 170, and 180 all use the same service set identifier (SSID) to identify the Wi-Fi group. For multicasting, source device 120 sends out the multicast media data using a well-known, predefined broadcast medium access control (MAC) address as the receiving address. All of sink devices 160, 170 and 180 in WD system 100 are able to receive the multicast media data at the MAC layer because they belong to the same Wi-Fi group as source device 120.

In order to send only a single copy of multicast media data for a given multicast session to all interested sink devices in WD system 100, source device 120 selects a multicast Internet Protocol (IP) address and a receiving multicast port number as a destination identifier for the multicast session. Sink devices 160, 170 and/or 180 interested in participating in the given multicast session then bind on the multicast IP address and receiving multicast port associated with the multicast session. Source device 120 broadcasts the media data for the multicast session to all sink devices 160, 170 and 180 in WD system 100 using the broadcast MAC address. The interested sink devices 160, 170 and/or 180 that are bound on the multicast IP address and the receiving multicast port associated with the multicast session will receive the media data and pass the received media data to a higher level for processing. This disclosure describes several exemplary multicast subscription procedures to ensure correct binding on the multicast address and receiving multicast port at each of sink devices 160, 170 and 180.

Source device 120 and each of sink devices 160, 170 and 180 may be either mobile devices or wired devices with wireless communication capabilities. As mobile devices, for example, one or more of source device 120 and sink devices 160, 170 and 180 may comprise mobile telephones, portable computers with wireless communication cards, personal digital assistants (PDAs), portable media players, or other flash memory devices with wireless communication capabilities, including so-called "smart" phones and "smart" pads or tablets, or other types of wireless communication devices. As wired devices, for example, one or more of source device 120 and sink devices 160, 170 and 180 may comprise televisions, desktop computers, monitors, projectors, and the like, that include wireless communication capabilities. In some cases, each of source device 120 and sink devices 160, 170 and 180 may comprise a system of devices including, for example, a display, speakers, user interface (UI) devices, and processors that are all separate but interoperative devices.

In this disclosure, the term source device is generally used to refer to the device that is transmitting A/V data, and the term sink device is generally used to refer to the device that is receiving the A/V data from the source device. In many cases, source device 120 and sink devices 160, 170 and 180 may be similar or identical devices, with one device operating as the source and the other operating as the sink. Moreover, these rolls may be reversed in different communication sessions. Thus, a sink device in one communication session may become a source device in a subsequent communication session, or vice versa.

Figure 1B:
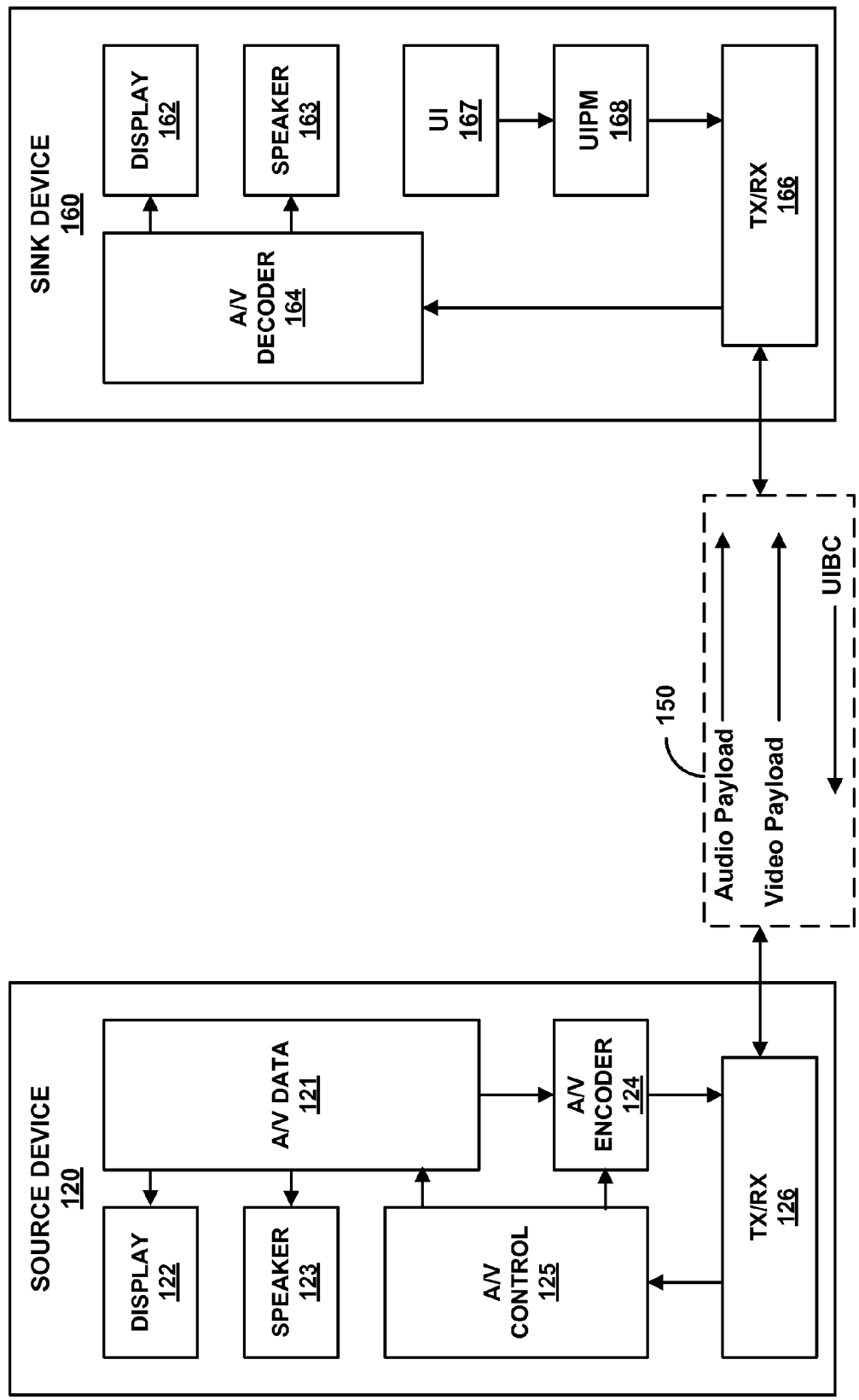
FIG. 1B is a block diagram illustrating an example of the source device and one of the sink devices from FIG. 1A in greater detail.

FIG. 1B is a block diagram illustrating an example of source device 120 and one of the sink devices 160 from FIG. 1A in greater detail. As shown in FIG. 1B, source device 120 communicates with sink device 160 via communication channel 150.

Source device 120 may include a memory that stores audio and/or video (A/V) data 121, display 122, speaker 123, audio and/or video (A/V) encoder 124 (also referred to as encoder 124), audio and/or video (A/V) control module 125, and transmitter/receiver (TX/RX) unit 126. Sink device 160 may include display 162, speaker 163, audio and/or video (A/V) decoder 164 (also referred to as decoder 164), transmitter/receiver unit 166, user input (UI) device 167, and user input processing module (UIPM) 168. The illustrated components constitute merely one example configuration for a source device and a sink device in a WD system. Other configurations may include fewer components than those illustrated or may include additional components than those illustrated.

In the example of FIG. 1, source device 120 can display the video portion of A/V data 121 on display 122 and can output the audio portion of A/V data 121 on speaker 123. A/V data 121 may be stored locally on source device 120, accessed from an external storage medium such as a file server, hard drive, external memory, Blu-ray disc, DVD, or other physical storage medium, or may be streamed to source device 120 via a network connection such as the internet. In some instances A/V data 121 may be captured in real-time via a camera and microphone of source device 120. A/V data 121 may include multimedia content such as movies, television shows, or music, but may also include real-time content generated by source device 120. Such real-time content may, for example, be produced by applications running on source device 120, or video data captured, e.g., as part of a video telephony session. Such real-time content may in some instances include a video frame of user input options available for a user to select. In some instances, A/V data 121 may include video frames that are a combination of different types of content, such as a video frame of a movie or TV program that has user input options overlaid on the frame of video.

In addition to rendering A/V data 121 locally via display 122 and speaker 123, A/V encoder 124 of source device 120 can encode A/V data 121, and transmitter/receiver unit 126 can transmit the encoded data over communication channel 150 to sink device 160. Transmitter/receiver unit 166 of sink device 160 receives the encoded data, and A/V decoder 164 decodes the encoded data and outputs the decoded data via display 162 and speaker 163. In this manner, the audio and video data being rendered by display 122 and speaker 123 can be simultaneously rendered by display 162 and speaker 163. The audio data and video data may be arranged in frames, and the audio frames may be time-synchronized with the video frames when rendered.

A/V encoder 124 and A/V decoder 164 may implement any number of audio and video compression standards, such as the ITU-T H.264 standard, alternatively referred to as MPEG-4, Part 10, Advanced Video Coding (AVC), or the newly emerging high efficiency video coding (HEVC) standard. Many other types of proprietary or standardized compression techniques may also be used. Generally speaking, A/V decoder 164 is configured to perform the reciprocal coding operations of A/V encoder 124. Although not shown in FIG. 1, in some aspects, A/V encoder 124 and A/V decoder 164 may each be integrated with an audio encoder and decoder, and may include appropriate MUX-DEMUX units, or other hardware and software, to handle encoding of both audio and video in a common data stream or separate data streams.

A/V encoder 124 may also perform other encoding functions in addition to implementing a video compression standard as described above. For example, A/V encoder 124 may add various types of metadata to A/V data 121 prior to A/V data 121 being transmitted to sink device 160. In some instances, A/V data 121 may be stored on or received at source device 120 in an encoded form and thus not require further compression by A/V encoder 124.

Although, FIG. 1 shows communication channel 150 carrying audio payload data and video payload data separately, it is to be understood that in some instances video payload data and audio payload data may be part of a common data stream. If applicable, MUX-DEMUX units may conform to the ITU H.223 multiplexer protocol, or other protocols such as the user datagram protocol (UDP). A/V encoder 124 and A/V decoder 164 each may be implemented as one or more microprocessors, digital signal processors (DSPs), application specific integrated circuits (ASICs), field programmable gate arrays (FPGAs), discrete logic, software, hardware, firmware or any combinations thereof. Each of A/V encoder 124 and A/V decoder 164 may be included in one or more encoders or decoders, either of which may be integrated as part of a combined encoder/decoder (CODEC). Thus, each of source device 120 and sink device 160 may comprise specialized machines configured to execute one or more of the techniques of this disclosure.

Display 122 and display 162 may comprise any of a variety of video output devices such as a cathode ray tube (CRT), a liquid crystal display (LCD), a plasma display, a light emitting diode (LED) display, an organic light emitting diode (OLED) display, or another type of display device. In these or other examples, the displays 122 and 162 may each be emissive displays or transmissive displays. Display 122 and display 162 may also be touch displays such that they are simultaneously both input devices and display devices. Such touch displays may be capacitive, resistive, or other type of touch panel that allows a user to provide user input to the respective device.

Speaker 123 and speaker 163 may comprise any of a variety of audio output devices such as headphones, a single-speaker system, a multi-speaker system, or a surround sound system. Additionally, although display 122 and speaker 123 are shown as part of source device 120 and display 162 and speaker 163 are shown as part of sink device 160, source device 120 and sink device 160 may in fact be a system of devices. As one example, display 162 may be a television, speaker 163 may be a surround sound system, and decoder 164 may be part of an external box connected, either wired or wirelessly, to display 162 and speaker 163. In other instances, sink device 160 may be a single device, such as a tablet computer or smartphone. In still other cases, source device 120 and sink device 160 are similar devices, e.g., both being smartphones, tablet computers, or the like. In this case, one device may operate as the source and the other may operate as the sink. These rolls may even be reversed in subsequent communication sessions. In still other cases, the source device may comprise a mobile device, such as a smartphone, laptop or tablet computer, and the sink device may comprise a more stationary device (e.g., with an AC power cord), in which case the source device may deliver audio and video data for presentation to a large crowd via the sink device.

Transmitter/receiver unit 126 and transmitter/receiver unit 166 may each include various mixers, filters, amplifiers and other components designed for signal modulation, as well as one or more antennas and other components designed for transmitting and receiving data. Communication channel 150 generally represents any suitable communication medium, or collection of different communication media, for transmitting video data from source device 120 to sink device 160. Communication channel 150 is usually a relatively short-range communication channel, similar to Wi-Fi, Bluetooth, or the like. However, communication channel 150 is not necessarily limited in this respect, and may comprise any wireless or wired communication medium, such as a radio frequency (RF) spectrum or one or more physical transmission lines, or any combination of wireless and wired media. In other examples, communication channel 150 may even form part of a packet-based network, such as a wired or wireless local area network, a wide-area network, or a global network such as the Internet. Additionally, communication channel 150 may be used by source device 120 and sink device 160 to create a peer-to-peer link.

Source device 120 and sink device 160 may establish a communication session according to a capability negotiation using, for example, Real-Time Streaming Protocol (RTSP) control messages. Source device 120 and sink device 160 may then communicate over communication channel 150 using a communications protocol such as a standard from the IEEE 802.11 family of standards. Source device 120 and sink device 160 may, for example, communicate according to the Wi-Fi Direct (WFD) standard, such that source device 120 and sink device 160 communicate directly with one another without the use of an intermediary such as wireless access points or so called hotspots. Source device 120 and sink device 160 may also establish a tunneled direct link setup (TDLS) to avoid or reduce network congestion. WFD and TDLS are intended to setup relatively short-distance communication sessions. Relatively short distance in this context may refer to, for example, less than approximately 70 meters, although in a noisy or obstructed environment the distance between devices may be even shorter, such as less than approximately 35 meters, or less than approximately 20 meters.

The techniques of this disclosure may at times be described with respect to WFD, but it is contemplated that aspects of these techniques may also be compatible with other communication protocols. By way of example and not limitation, the wireless communication between source device 120 and sink device may utilize orthogonal frequency division multiplexing (OFDM) techniques. A wide variety of other wireless communication techniques may also be used, including but not limited to time division multi access (TDMA), frequency division multi access (FDMA), code division multi access (CDMA), or any combination of OFDM, FDMA, TDMA and/or CDMA.

In addition to decoding and rendering data received from source device 120, sink device 160 can also receive user inputs from user input device 167. User input device 167 may, for example, be a keyboard, mouse, trackball or track pad, touch screen, voice command recognition module, or any other such user input device. UIPM 168 formats user input commands received by user input device 167 into a data packet structure that source device 120 is capable of interpreting. Such data packets are transmitted by transmitter/receiver 166 to source device 120 over communication channel 150. Transmitter/receiver unit 126 receives the data packets, and A/V control module 125 parses the data packets to interpret the user input command that was received by user input device 167. Based on the command received in the data packet, A/V control module 125 can change the content being encoded and transmitted. In this manner, a user of sink device 160 can control the audio payload data and video payload data being transmitted by source device 120 remotely and without directly interacting with source device 120.

Additionally, users of sink device 160 may be able to launch and control applications on source device 120. For example, a user of sink device 160 may able to launch a photo editing application stored on source device 120 and use the application to edit a photo that is stored locally on source device 120. Sink device 160 may present a user with a user experience that looks and feels like the photo is being edited locally on sink device 160 while in fact the photo is being edited on source device 120. Using such a configuration, a device user may be able to leverage the capabilities of one device for use with several devices. For example, source device 120 may be a smartphone with a large amount of memory and high-end processing capabilities. When watching a movie, however, the user may wish to watch the movie on a device with a bigger display screen, in which case sink device 160 may be a tablet computer or even larger display device or television. When wanting to send or respond to email, the user may wish to use a device with a physical keyboard, in which case sink device 160 may be a laptop. In both instances, the bulk of the processing may still be performed by source device 120 even though the user is interacting with a sink device. The source device and the sink device may facilitate two way interactions by negotiating and or identifying the capabilities of the devices in any given session.

In some configurations, A/V control module 125 may be an operating system process being executed by the operating system of source device 120. In other configurations, however, A/V control module 125 may be a software process of an application running on source device 120. In such a configuration, the user input command may be interpreted by the software process, such that a user of sink device 160 is interacting directly with the application running on source device 120, as opposed to the operating system running on source device 120. By interacting directly with an application as opposed to an operating system, a user of sink device 160 may have access to a library of commands that are not native to the operating system of source device 120. Additionally, interacting directly with an application may enable commands to be more easily transmitted and processed by devices running on different platforms.

User inputs applied at sink device 160 may be sent back to source device 120 over communication channel 150. In one example, a reverse channel architecture, also referred to as a user interface back channel (UIBC) may be implemented to enable sink device 160 to transmit the user inputs applied at sink device 160 to source device 120. The reverse channel architecture may include upper layer messages for transporting user inputs, and lower layer frames for negotiating user interface capabilities at sink device 160 and source device 120. The UIBC may reside over the Internet Protocol (IP) transport layer between sink device 160 and source device 120. In this manner, the UIBC may be above the transport layer in the Open System Interconnection (OSI) communication model. To promote reliable transmission and in sequence delivery of data packets containing user input data, UIBC may be configured to run on top of other packet-based communication protocols such as the transmission control protocol/internet protocol (TCP/IP) or the user datagram protocol (UDP). UDP and TCP can operate in parallel in the OSI layer architecture. TCP/IP can enable sink device 160 and source device 120 to implement retransmission techniques in the event of packet loss.

The UIBC may be designed to transport various types of user input data, including cross-platform user input data. For example, source device 120 may run the iOS® operating system, while sink device 160 runs another operating system such as Android® or Windows®. Regardless of platform, UIPM 168 can encapsulate received user input in a form understandable to A/V control module 125. A number of different types of user input formats may be supported by the UIBC so as to allow many different types of source and sink devices to exploit the protocol regardless of whether the source and sink devices operate on different platforms. Generic input formats may be defined, and platform specific input formats may both be supported, thus providing flexibility in the manner in which user input can be communicated between source device 120 and sink device 160 by the UIBC.

The techniques of this disclosure enable source device 120 to establish a multicast communication session with sink device 160 and one or more additional sink devices in the WD system. Conventionally, when two or more sink devices may be interested in receiving the same media data, a source device establishes a unicast session with each of the sink devices, and sends a separate copy of the same media data to each of the interested sink devices on a receiving port for the particular sink device. According to the techniques of this disclosure, however, source device 120 may establish a multicast session with sink device 160 and one or more additional sink devices in the WD system, and send a single copy of multicast media data to the interested sink devices using a multicast address and a receiving multicast port.

More specifically, in order to provide multicasting in the WD system, source device 120 selects a multicast IP address and a receiving multicast port number as a destination identifier for each multicast session available at source device 120. If interested in receiving the media data of a given multicast session, sink device 160 binds on the multicast IP address and receiving multicast port associated with the multicast session. Source device 120 broadcasts the media data of the multicast session to all the sink devices in the WD system. Sink device 160, and any other interested sink devices that are bound on the multicast IP address and the receiving multicast port associated with the multicast session, will receive and process the media data. Several exemplary multicast subscription procedures that ensure correct binding on the multicast address and receiving multicast port at each of the sink devices are described in more detail below.

Figure 2:
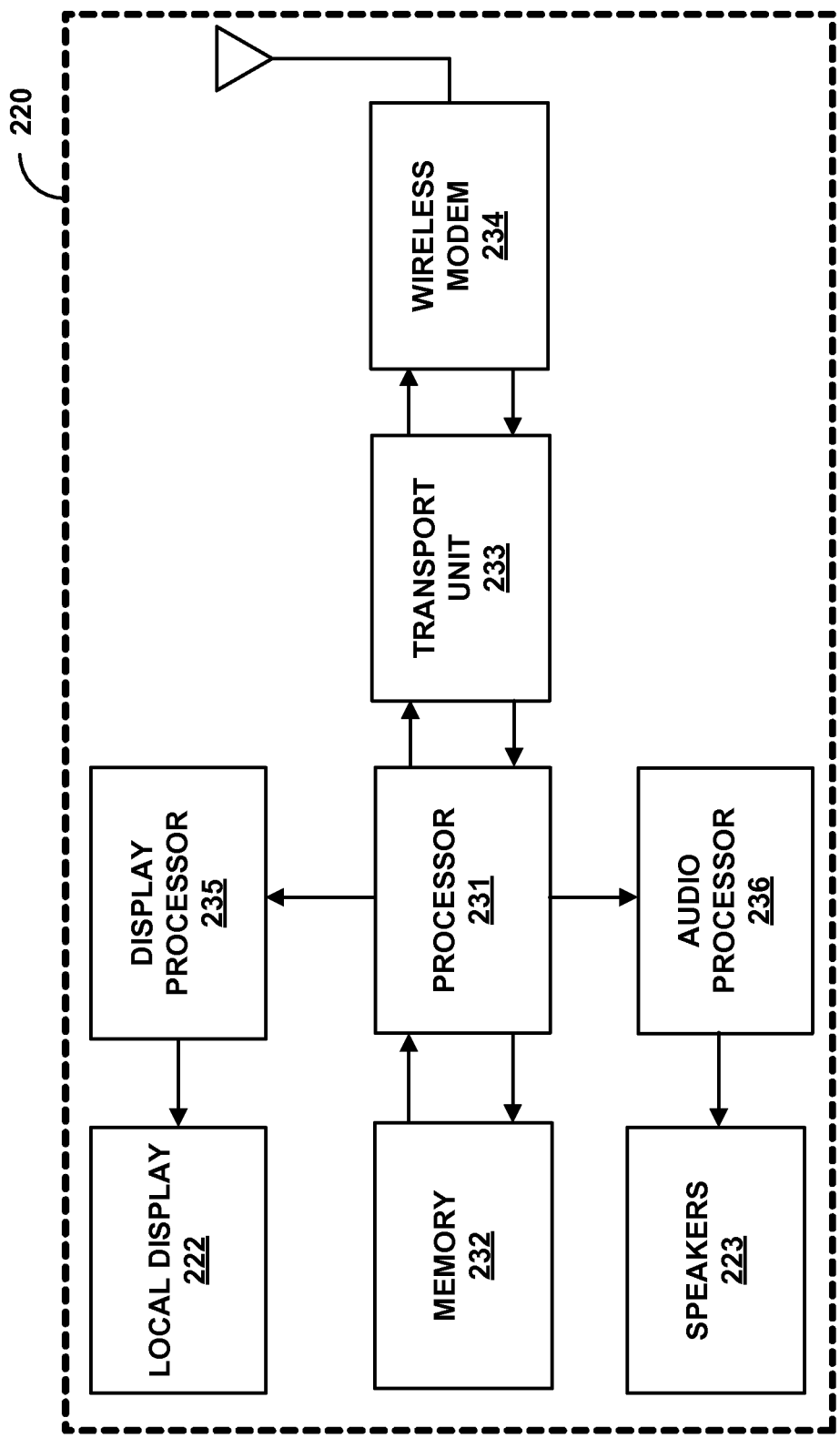
FIG. 2 is a block diagram illustrating an example of a source device that may implement techniques of this disclosure.

FIG. 2 is a block diagram showing one example of a source device 220 that may implement techniques of this disclosure. Source device 220 may be a device similar to source device 120 in FIGS. 1A & 1B and may operate in the same manner as source device 120. Source device 220 includes local display 222, speakers 223, processor 231, display processor 235, audio processor 236, memory 232, transport unit 233, and wireless modem 234. As shown in FIG. 2, source device 220 may include one or more processors (i.e. processor 231, display processor 235 and audio processor 236) that encode and/or decode A/V data for transport, storage, and display. The media or A/V data may for example be stored at memory 232. Memory 232 may store an entire A/V file, or may comprise a smaller buffer that simply stores a portion of an A/V file, e.g., streamed from another device or source.

Transport unit 233 may process encoded A/V data for network transport. For example, encoded A/V data may be processed by processor 231 and encapsulated by transport unit 233 into Network Access Layer (NAL) units for communication across a network. The NAL units may be sent by wireless modem 234 to a wireless sink device via a network connection. Wireless modem 234 may, for example, be a Wi-Fi modem configured to implement one of the IEEE 802.11 family of standards. Source device 220 may also locally process and display A/V data. In particular, display processor 235 may process video data to be displayed on local display 222, and audio processor 236 may process audio data for output on speaker 223.

As described above with reference to source device 120 of FIG. 1, source device 220 may receive user input commands from a sink device. For example, wireless modem 234 of source device 220 may receive encapsulated user input data packets, such as NAL units, from a sink device and send the encapsulated data units to transport unit 233 for decapsulation. Transport unit 233 may extract the user input data packets from the NAL units, and processor 231 may parse the data packets to extract the user input commands. Based on the user input commands, processor 231 modifies the type of A/V data being processed by source device 220. In other examples, source device 220 may include a user input unit or driver (not shown in FIG. 2) that receives the user input data packets from transport unit 233, parses the data packets to extract the user input commands, and direct processor 231 to modify the type of A/V data being processed by source device 220 based on the user input commands. In this manner, the functionality described above in reference to A/V control module 125 of FIG. 1 may be implemented, either fully or partially, by processor 231.

Processor 231 of FIG. 2 generally represents any of a wide variety of processors, including but not limited to one or more digital signal processors (DSPs), general purpose microprocessors, application specific integrated circuits (ASICs), field programmable logic arrays (FPGAs), other equivalent integrated or discrete logic circuitry, or some combination thereof. Memory 232 of FIG. 2 may comprise any of a wide variety of volatile or non-volatile memory, including but not limited to random access memory (RAM) such as synchronous dynamic random access memory (SDRAM), read-only memory (ROM), non-volatile random access memory (NVRAM), electrically erasable programmable read-only memory (EEPROM), FLASH memory, and the like, Memory 232 may comprise a computer-readable storage medium for storing audio/video data, as well as other kinds of data. Memory 232 may additionally store instructions and program code that are executed by processor 231 as part of performing the various techniques described in this disclosure.

According to the techniques of this disclosure, source device 220 may establish a multicast communication session with multiple sink devices in a WD system. Source device 220 may then send a single copy of multicast media data to sink devices interested in receiving the same media data using a multicast address and a receiving multicast port associated with the multicast session. Source device 220 selects a multicast IP address and a receiving multicast port number as a destination identifier for each multicast session available at source device 220. The sink devices interested in receiving the media data of a given multicast session bind on the multicast IP address and the receiving multicast port associated with the multicast session. Source device 220 then broadcasts the media data of the multicast session to all the sink devices in the WD system, and the sink devices that are bound on the multicast IP address and the receiving multicast port associated with the multicast session will receive and process the media data.

This disclosure describes several exemplary multicast subscription procedures that ensure correct binding on the multicast address and receiving multicast port at each of the sink devices. In the example of FIG. 2, processor 231 of source device 220 may be configured to perform any of the multicast subscription procedures. In other examples, a separate processor or functional module (not shown in FIG. 2) of source device 220 may be configured to perform the multicast subscription procedures described in this disclosure.

In a first exemplary multicast subscription procedure, source device 220 may use a well-known multicast subscription protocol, e.g., the Internet Group Management Protocol (IGMP), to establish the multicast session. Source device 220 performs a RTSP (Real Time Steaming Protocol) negotiation with the sink devices in the WD system to determine a port number for communication of the multicast subscription protocol. For example, source device 220 may use a RTSP GET_PARAMETER exchange to obtain port number information at each of the sink devices for the multicast subscription protocol communication channel.

Source device 220 then uses the multicast subscription protocol to advertise a multicast session, and one or more of the sink devices may use the multicast subscription protocol to request to join the multicast session. In this case, the WFD specification has a fixed multicast port number for a particular multicast application. The WFD specification provides the fixed multicast port number to the multicast subscription protocol to notify the sink devices participating in the multicast session of the fixed multicast port number.

In a second exemplary multicast subscription procedure, referred to as the "static" multicast subscription procedure, source device 220 uses the RTSP capability negotiation phase of the WD communication session setup to establish the multicast communication session. In this case, source device 220 sends the multicast media data on a well-known, predefined multicast IP address and port. All of the sink devices, therefore, may blindly bind on the multicast IP address and receiving multicast port to receive any possible multicast data.

The techniques provide a subscription procedure to avoid the sink devices blindly binding on the receiving multicast port only to drop unwanted multicast media data. The techniques allow source device 220 to first advertise availability of media data for a multicast session, and allow the sink devices to specifically request the multicast media data when interested. Source device 220 advertises the availability of media data to the sink devices using RTSP, e.g., using the RTSP SET_PARAMETER request. Each of the sink devices may request either the multicast media data or the unicast media data, e.g., using the RTSP SETUP request. In the case of the multicast media data, the WFD specification provides a predefined multicast port number. In the case of the unicast media data, each requesting sink device provides a unicast port number. The static multicast subscription procedure is described in more detail with respect to FIG. 5.

In a third exemplary multicast subscription procedure, referred to as the "dynamic" multicast subscription procedure, source device 220 uses the RTSP capability negotiation phase of the of the WD communication session setup to establish the multicast communication session and to select the multicast port number for the multicast session. Unlike the first and second exemplary multicast subscription procedures described above, the dynamic multicast subscription procedure enables source device 220 to select the multicast port number for a multicast session based on available port numbers of the interested sink devices.

Source device 220 first queries each sink device for its general interest in multicast media data and its available ports, e.g., using the RTSP GET_PARAMETER request. Each of the sink devices responds indicating whether it is interested in receiving multicast media data and, if interested, provides available multicast port numbers. Source device 220 then selects a multicast port number available at all of the interested sink devices for each specific multicast session. Source device 220 advertises the availability of multicast media data for each of the multicast sessions and the selected multicast port number for the multicast session to the sink devices, e.g., using the RTSP SET_PARAMETER exchange. Each of the sink devices may request the multicast media data of a specific multicast session or the unicast media data, e.g., using the RTSP SETUP exchange. In the case of the multicast media data, each requesting sink device already knows the selected multicast port number for the multicast session from the initial advertisement. In the case of the unicast media data, each requesting sink device provides a unicast port number to source device 220.

If a new sink device joins during the multicast session, the selected multicast port number may need to be revised if the new sink device does not have the selected port available. In one example, the port number may be revised using blind port revision in which the port numbers for all the multicast sessions available at source device 220 are revised to be available at all the sink devices, regardless of which multicast sessions the new sink device is interested in joining. Once the multicast port number is revised, source device 220 notifies all the sink devices of the new port number. In addition, source device 220 may send the multicast media data to both the old port number and the new port number for a predetermined period of time. The dynamic multicast subscription procedure with blind port revision is described in more detail with respect to FIG. 6.

In another example, the port number may be revised using informed port revision in which source device 220 determines which multicast session the new sink device is interested in joining and then revises the port number for only that multicast session. In the case of informed port revision, source device 220 queries each sink device for its interest in a specific multicast session, e.g., using the RTSP GET_PARAMETER request, instead of performing the general query described above. The informed port revision procedure may provide a more efficient use of port numbers, because the port number for each multicast session only needs to be available at those sink devices that belong to the specific multicast session, and not to all sink devices generally interested in receiving multicast data. The dynamic multicast subscription procedure with informed port revision is described in more detail with respect to FIG. 7.

In the case where a second sink device joins a WD system that includes only a single sink device participating in a unicast session, source device 220 may transition to a multicast session with both sink devices. According to the techniques, source device 220 performs one of the multicast subscription procedures described above with the second sink device. If the second sink device requests to join the multicast session, source device 220 sends the multicast media data to the second sink device while continuing to send the unicast media data to the first sink device. Source device 220 then performs the multicast subscription procedure with the first sink device. Once the first sink device joins the multicast session, source device 220 discontinues the unicast session. The procedure for converting a unicast communication session to a multicast session is described in more detail with respect to FIG. 8.

Figure 3:
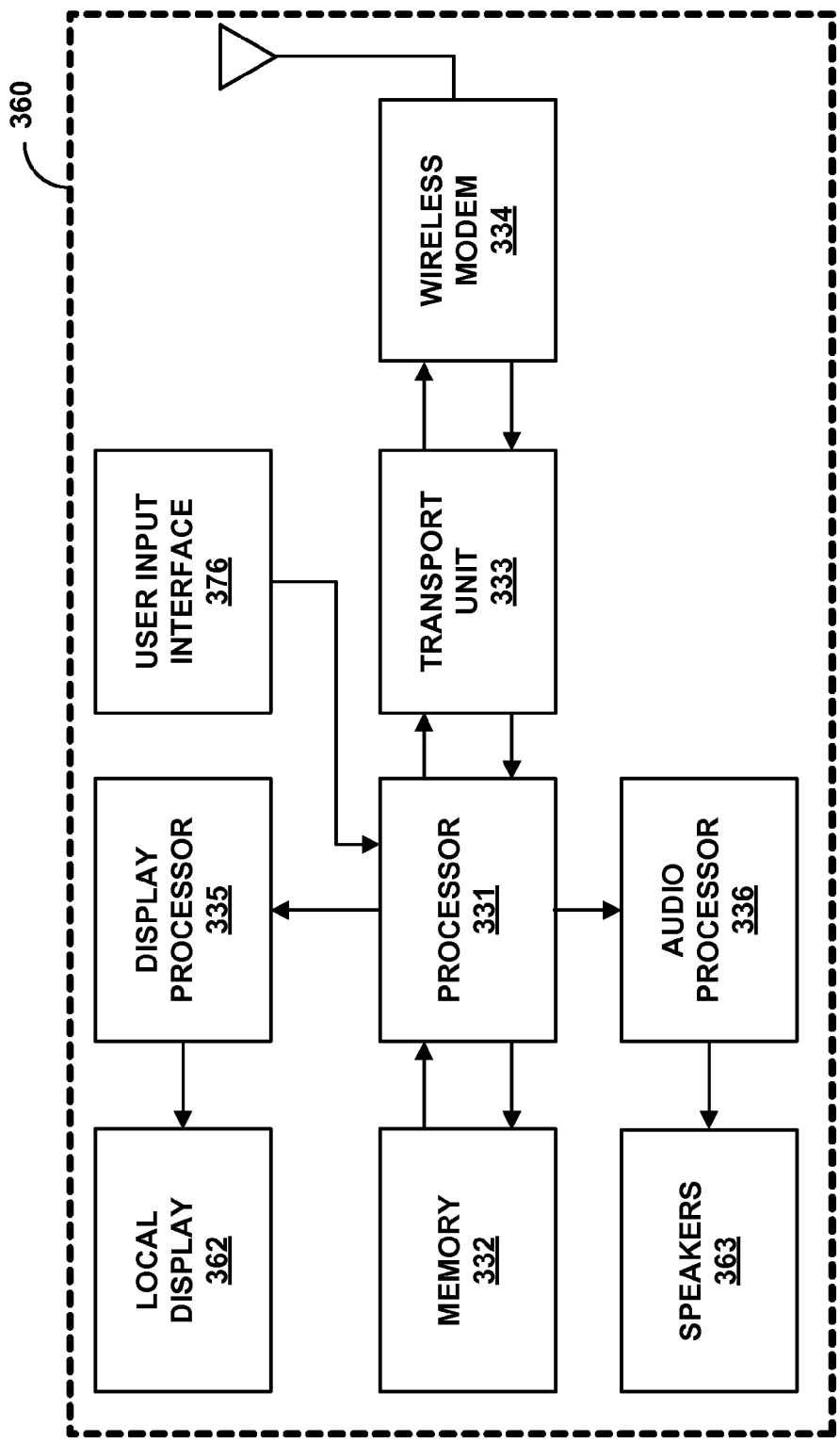
FIG. 3 is a block diagram illustrating an example of a sink device that may implement techniques of this disclosure.

FIG. 3 is a block diagram illustrating an example of a sink device that may implement techniques of this disclosure. Sink device 360 may be similar to sink device 160 in FIGS. 1A & 1B. Sink device 360 includes processor 331, memory 332, transport unit 333, wireless modem 334, display processor 335, local display 362, audio processor 336, speaker 363, and user input interface 376. Sink device 360 receives at wireless modem 334 encapsulated data units sent from a source device. Wireless modem 334 may, for example, be a Wi-Fi modem configured to implement one more standards from the IEEE 802.11 family of standards. Transport unit 333 can decapsulate the encapsulated data units. For instance, transport unit 333 may extract encoded video data from the encapsulated data units and send the encoded A/V data to processor 331 to be decoded and rendered for output. Display processor 335 may process decoded video data to be displayed on local display 362, and audio processor 336 may process decoded audio data for output on speaker 363.

In addition to rendering audio and video data, wireless sink device 360 may also receive user input data through user input interface 376. User input interface 376 can represent any of a number of user input devices included but not limited to a touch display interface, a keyboard, a mouse, a voice command module, gesture capture device (e.g., with camera-based input capturing capabilities) or any other of a number of user input devices. User input received through user input interface 376 can be processed by processor 331. This processing may include generating data packets that include the received user input command. Once generated, transport unit 333 may process the data packets for network transport to a source device over a UIBC.

Processor 331 of FIG. 3 may comprise one or more of a wide range of processors, such as one or more digital signal processors (DSPs), general purpose microprocessors, application specific integrated circuits (ASICs), field programmable gate arrays (FPGAs), other equivalent integrated or discrete logic circuitry, or some combination thereof. Memory 332 of FIG. 3 may comprise any of a wide variety of volatile or non-volatile memory, including but not limited to random access memory (RAM) such as synchronous dynamic random access memory (SDRAM), read-only memory (ROM), non-volatile random access memory (NVRAM), electrically erasable programmable read-only memory (EEPROM), FLASH memory, and the like, Memory 232 may comprise a computer-readable storage medium for storing audio/video data, as well as other kinds of data. Memory 332 may additionally store instructions and program code that are executed by processor 331 as part of performing the various techniques described in this disclosure.

According to the techniques of this disclosure, sink device 360 may participate in a multicast communication session with a source device and one or more other sink devices in a WD system. The source device may then send a single copy of multicast media data to sink device 360 and any other sink devices interested in receiving the same media data using a multicast address and a receiving multicast port for the multicast session. The source device selects a multicast IP address and a receiving multicast port number as a destination identifier for each multicast session available at the source device. Sink device 360 knows the multicast IP address and the receiving multicast port number for each multicast session, because the address and port number are either predefined by the WFD specification or advertised by the source device. If interested in receiving the media data of a given multicast session, sink device 360 binds on the multicast IP address and receiving multicast port associated with the multicast session. The source device then broadcasts the media data of the multicast session to sink device 360 and the other participating sink devices in the WD system, and sink device 360, which is bound on the multicast IP address and the receiving multicast port associated with the multicast session, receives and processes the media data.

This disclosure describes several exemplary multicast subscription procedures that ensure correct binding on the multicast address and receiving multicast port at each of the sink devices. In the example of FIG. 3, processor 331 of sink device 360 may be configured to perform any of the multicast subscription procedures. In other examples, a separate processor or functional module (not shown in FIG. 3) of sink device 360 may be configured to perform the multicast subscription procedures described in this disclosure.

In a first exemplary multicast subscription procedure, sink device 360 may use a well-known multicast subscription protocol, e.g., IGMP, to join a multicast session. Sink device 360 participates in a RTSP negotiation with the source device to inform the source device of a port number at sink device 360 for communication of the multicast subscription protocol. For example, sink device 360 may use a RTSP GET_PARAMETER exchange to send port number information to the source device for the multicast subscription protocol communication channel.

The source device then uses the multicast subscription protocol to advertise multicast media data for a multicast session, and sink device 360 uses the multicast subscription protocol to request to join the advertised multicast session. In this case, the WFD specification has a fixed multicast port number for a particular multicast application. The WFD specification provides the fixed multicast port number to the multicast subscription protocol to notify the sink devices participating in the multicast session of the fixed multicast port number.

In a second exemplary multicast subscription procedure, referred to as the "static" multicast subscription procedure, sink device 360 uses the RTSP capability negotiation phase of the WD communication session setup to join a multicast session. In this case, the source device sends the multicast media data on a well-known, predefined multicast IP address and port. Sink device 360, along with any other sink devices, therefore, may blindly bind on the multicast IP address and port to receive any possible multicast data.

The techniques provide a subscription procedure to avoid sink device 360 blindly binding on the receiving multicast port only to drop unwanted multicast media data. The techniques allow the source device to first advertise the availability of multicast media data for the multicast session, and sink device 360 to specifically request the multicast media data when interested. The source device advertises the availability of media data to sink device 360 using RTSP, e.g., using the RTSP SET_PARAMETER request. In response, sink device 360 may request either the multicast media data or the unicast media data, e.g., using the RTSP SETUP request. In the case of the multicast media data, the WFD specification provides a predefined multicast port number. In the case of the unicast media data, each requesting sink device provides a unicast port number to the source device. The static multicast subscription procedure is described in more detail with respect to FIG. 5.

In a third exemplary multicast subscription procedure, referred to as the "dynamic" multicast subscription procedure, sink device 360 uses the RTSP capability negotiation phase of the of the WD communication session setup to join a multicast session and to receive notification of the multicast port number for the multicast session. Unlike the first and second exemplary multicast subscription procedures described above, the dynamic multicast subscription procedure enables the source device to select the multicast port number for a multicast session based on available port numbers of sink device 360 and the other interested sink devices.

The source device first queries each sink device for its general interest in multicast media data and its available ports, e.g., using the RTSP GET_PARAMETER request. Sink device 360 responds indicating whether it is interested in receiving multicast media data and, if interested, provides its available multicast port numbers. The source device then selects a multicast port number available at all of the interested sink devices for each specific multicast session available at the source device. The source device advertises the availability of multicast media data for each of the multicast sessions and the selected multicast port number for the multicast session to sink device 360 and the other interested sink devices, e.g., using the RTSP SET_PARAMETER exchange. Sink device 360 may then request the multicast media data of a specific multicast session or the unicast media data, e.g., using the RTSP SETUP exchange. In the case of the multicast media data, each requesting sink device already knows the selected multicast port number for the multicast session from the initial advertisement. In the case of the unicast media data, each requesting sink device provides a unicast port number to the source device. The dynamic multicast subscription procedure is described in more detail with respect to FIGS. 6 & 7.

Figure 4:
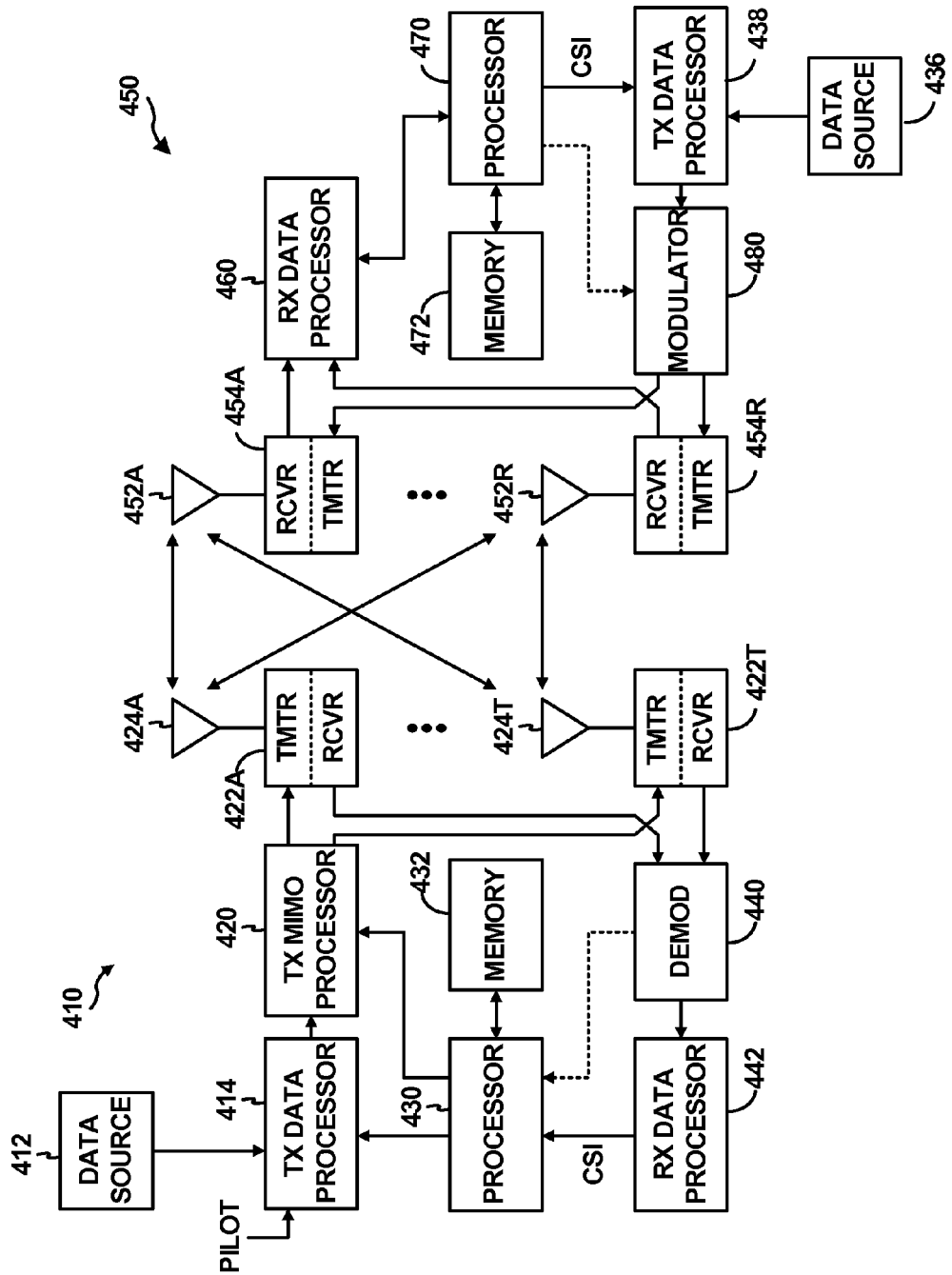
FIG. 4 is a block diagram illustrating a transmitter system and a receiver system that may implement techniques of this disclosure.

FIG. 4 is a block diagram illustrating an example transmitter system 410 and receiver system 450, which may be used by transmitter/receiver 126 and transmitter/receiver 166 of FIG. 1 for communicating over communication channel 150.

At transmitter system 410, traffic data for a number of data streams is provided from a data source 412 to a transmit (TX) data processor 414. Each data stream may be transmitted over a respective transmit antenna. TX data processor 414 formats, codes, and interleaves the traffic data for each data stream based on a particular coding scheme selected for that data stream. The coded data for each data stream may be multiplexed with pilot data using orthogonal frequency division multiplexing (OFDM) techniques. A wide variety of other wireless communication techniques may also be used, including but not limited to time division multi access (TDMA), frequency division multi access (FDMA), code division multi access (CDMA), or any combination of OFDM, FDMA, TDMA and/or CDMA.

Consistent with FIG. 4, the pilot data is typically a known data pattern that is processed in a known manner and may be used at receiver system 450 to estimate the channel response. The multiplexed pilot and coded data for each data stream is then modulated (e.g., symbol mapped) based on a particular modulation scheme (e.g., Binary Phase Shift Keying (BPSK), Quadrature Phase Shift Keying (QPSK), M-PSK, or M-QAM (Quadrature Amplitude Modulation), where M may be a power of two) selected for that data stream to provide modulation symbols. The data rate, coding, and modulation for each data stream may be determined by instructions performed by processor 430 which may be coupled with memory 432.

The modulation symbols for the data streams are then provided to a TX MIMO processor 420, which may further process the modulation symbols (e.g., for OFDM). TX MIMO processor 420 can then provide $N_T$ modulation symbol streams to $N_T$ transmitters (TMTR) 422A-422T ("transmitters 422"). In certain aspects, TX MIMO processor 420 applies beamforming weights to the symbols of the data streams and to the antenna from which the symbol is being transmitted. Each of transmitters 422 may receive and process a respective symbol stream to provide one or more analog signals, and further condition (e.g., amplify, filter, and upconvert) the analog signals to provide a modulated signal suitable for transmission over the MIMO channel. $N_T$ modulated signals from transmitters 422 are then transmitted from $N_T$ antennas 424A-424t ("antennas 424"), respectively.

At receiver system 450, the transmitted modulated signals are received by $N_R$ antennas 452A-452R ("antennas 452") and the received signal from each of antennas 452 is provided to a respective one of receivers (RCVR) 454A-454R ("receivers 454"). Each of receivers 454 conditions (e.g., filters, amplifies, and downconverts) a respective received signal, digitizes the conditioned signal to provide samples, and further processes the samples to provide a corresponding "received" symbol stream. A receive (RX) data processor 460 then receives and processes the $N_R$ received symbol streams from $N_R$ receivers 454 based on a particular receiver processing technique to provide $N_T$ "detected" symbol streams. The RX data processor 460 then demodulates, deinterleaves and decodes each detected symbol stream to recover the traffic data for the data stream. The processing by RX data processor 460 is complementary to that performed by TX MIMO processor 420 and TX data processor 414 at transmitter system 410.

A processor 470 that may be coupled with a memory 472 periodically determines which pre-coding matrix to use. The reverse link message may comprise various types of information regarding the communication link and/or the received data stream. The reverse link message is then processed by a TX data processor 438, which also receives traffic data for a number of data streams from a data source 436, modulated by a modulator 480, conditioned by transmitters 454, and transmitted back to transmitter system 410.

At transmitter system 410, the modulated signals from receiver system 450 are received by antennas 424, conditioned by receivers 422, demodulated by a demodulator 440, and processed by a RX data processor 442 to extract the reverse link message transmitted by the receiver system 450. Processor 430 then determines which pre-coding matrix to use for determining the beamforming weights and processes the extracted message.

Figure 5:
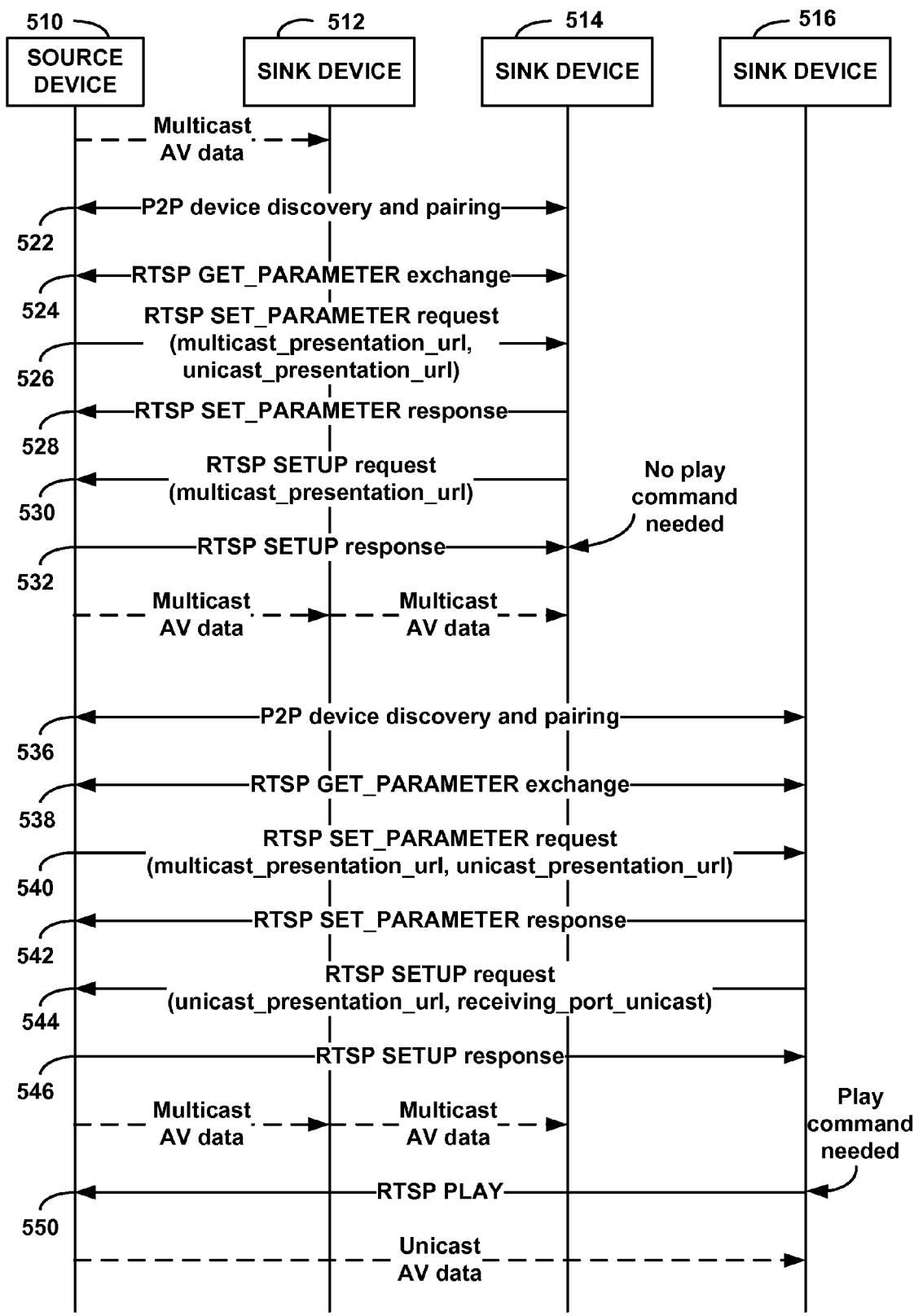
FIG. 5 is a conceptual diagram illustrating an exemplary message transfer sequence for establishing a multicast communication session between a source device and two sink devices using a static multicast subscription procedure.

FIG. 5 is a conceptual diagram illustrating an exemplary message transfer sequence for establishing a multicast communication session between a source device 510 and two sink devices 512, 514 using a static multicast subscription procedure. Source device 510 may generally operate in the same manner described above for source device 120 of FIGS. 1A & 1B and source device 220 of FIG. 2. Sink devices 512 and 514 may generally operate in the same manner described above for sink device 160 of FIGS. 1A & 1B and sink device 360 of FIG. 3.

In the illustrated example of FIG. 5, source device 510 has already established a multicast session with sink device 512 and is sending multicast media data to sink device 512 over the session. In order to communicate with sink device 514, source device 510 and sink device 514 perform P2P device discovery and pairing 522. In some cases, source device 510, sink device 512, and sink device 514 may form a Wi-Fi P2P group with source device 510 as the group owner.

After source device 510 and sink device 514 establish connectivity, source device 510 and sink device 514 may determine a set of parameters and capabilities for their communication session as part of a capability negotiation exchange using the RTSP GET_PARAMETER exchange 524. Based on exchange 524, source device 510 may determine the optimal set of parameters to be used for the communication session and send a RTSP SET_PARAMETER request message 526 to sink device 514. Request message 526 may contain the parameter set to be used during the communication session between source device 510 and sink device 514.

According to the static multicast subscription procedure, source device 510 advertises the availability of multicast media data for a multicast session and unicast media data for a unicast session to sink device 514. For example, as illustrated in FIG. 5, source device 510 advertises the availability of multicast media data to sink device 514 using a multicast_presentation_url parameter in the RTSP SET_PARAMETER request message 526. Source device 510 also advertises the availability of unicast media data using a unicast_presentation_url parameter in the same request message 526. The multicast_presentation_url parameter is used to distinguish the multicast content and its transmission mode from the unicast_presentation_url. Upon receipt of request message 526, sink device 514 responds with the RTSP SET_PARAMETER response message 528 including an RTSP status code indicating whether setting the parameters as specified in request message 526 was successful.

Sink device 514 may then request to receive either the multicast media data or the unicast media data using the RTSP SETUP request message 530. In the example of FIG. 5, sink device 514 requests to join the multicast session by sending request message 530 to source device 510 including the multicast_presentation_url parameter.

Upon receipt of request message 530, source device 510 responds with the RTSP SETUP response message 532 including an RTSP status code indicating whether adding sink device 514 to the multicast session was successful. In the static multicast subscription procedure, the WFD specification provides a predefined multicast port number for the multicast session to sink device 514. Upon receipt of response message 532, sink device 514 binds on the predefined multicast port to receive the advertised multicast media data. Source device 510 then sends a single copy of the multicast media data for the multicast session to both sink device 512 and 514 over the session using the predefined multicast port number. In this case, no play command is needed from sink device 514 to initiate transmission of the multicast media data from source device 510.

In the illustrated example of FIG. 5, source device 510 may also establish a unicast communication session with sink device 516. In order to communicate with sink device 516, source device 510 and sink device 516 perform P2P device discovery and pairing 536. After source device 510 and sink device 516 establish connectivity, source device 510 and sink device 516 may determine a set of parameters and capabilities for their communication session as part of a capability negotiation exchange using the RTSP GET_PARAMETER exchange 538. Based on exchange 538, source device 510 may determine the optimal set of parameters to be used for the communication session and send a RTSP SET_PARAMETER request message 540 to sink device 516. Request message 540 may contain the parameter set to be used during the communication session between source device 510 and sink device 516.

According to the static multicast subscription procedure, source device 510 advertises the availability of multicast media data for a multicast session and unicast media data for a unicast session to sink device 516. For example, as illustrated in FIG. 5, source device 510 advertises the availability of multicast media data using a multicast_presentation_url parameter and advertises the availability of unicast media data using a unicast_presentation_url parameter in the RTSP SET_PARAMETER request message 540. Upon receipt of request message 540, sink device 516 responds with the RTSP SET_PARAMETER response message 542 including an RTSP status code indicating whether setting the parameters as specified in request message 540 was successful.

Sink device 516 may then request to receive either the multicast media data or the unicast media data using the RTSP SETUP request message 544. In the example of FIG. 5, sink device 516 requests to join the unicast session by sending request message 544 to source device 510 including the unicast_presentation_url parameter. In this case, sink device 516 also provides an available receiving unicast port number on which to receive the unicast media data to source device 510 using the receiving_port_unicast parameter in request message 544.

Upon receipt of request message 544, source device 510 responds with the RTSP SETUP response message 546 including an RTSP status code indicating whether establishing the unicast session with sink device 516 was successful. In order to receive the unicast media data, sink device 516 sends RTSP PLAY command 550 to source device 510. Source device 510 then sends the unicast media data to sink devices 516 using the previously indicated receiving unicast port number for the unicast session.

Figure 6:
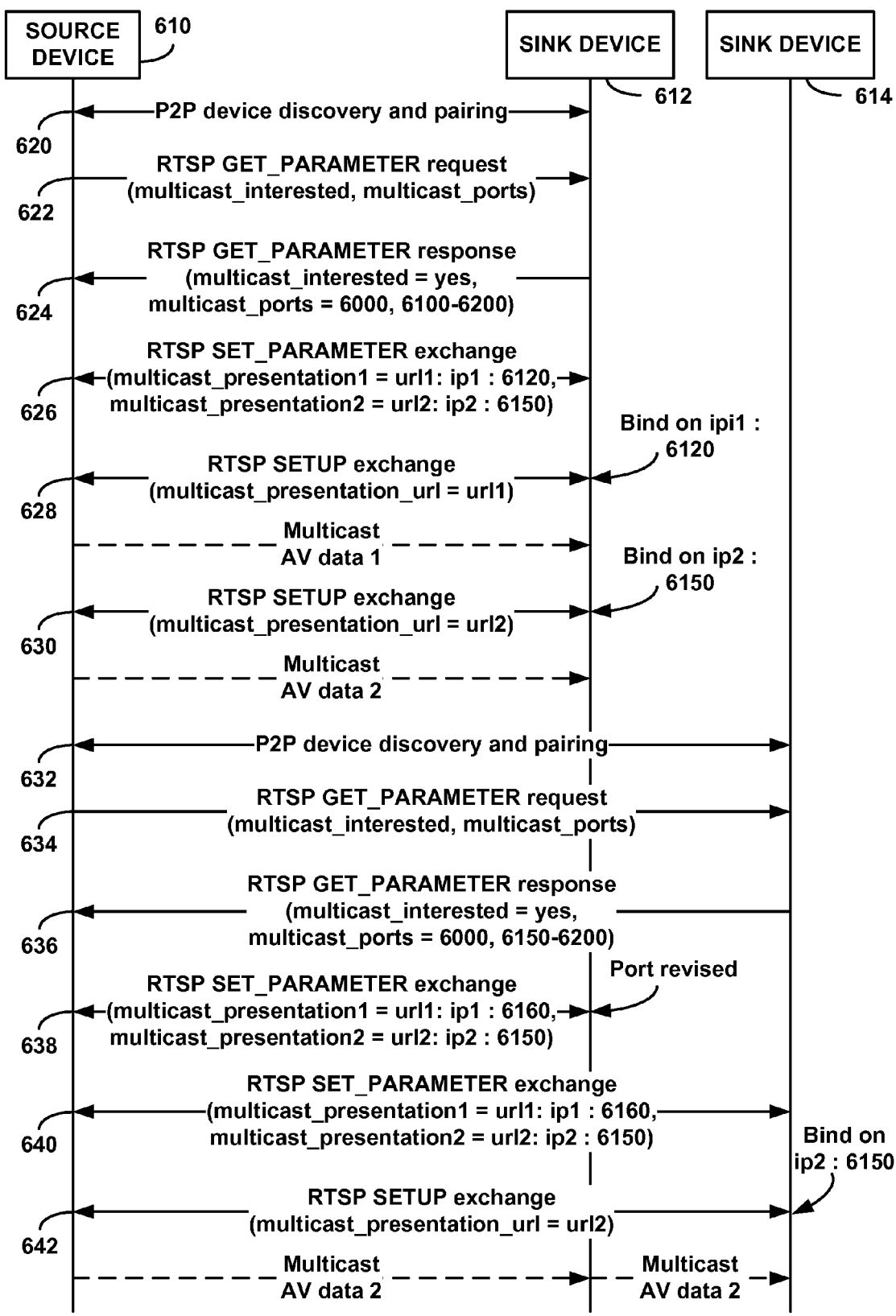
FIG. 6 is a conceptual diagram illustrating an exemplary message transfer sequence for establishing a multicast communication session between a source device and two sink devices using a dynamic multicast subscription procedure with blind port revision.

FIG. 6 is a conceptual diagram illustrating an exemplary message transfer sequence for establishing a multicast communication session between a source device 610 and two sink devices 612, 614 using a dynamic multicast subscription procedure with blind port revision. Source device 610 may generally operate in the same manner described above for source device 120 of FIGS. 1A & 1B and source device 220 of FIG. 2. Sink devices 612 and 614 may generally operate in the same manner described above for sink device 160 of FIGS. 1A & 1B and sink device 360 of FIG. 3.

In the illustrated example of FIG. 6, in order to establish a communication session with sink device 612, source device 610 first performs P2P device discovery and pairing 620 and sink device 612. After source device 610 and sink device 612 establish connectivity, source device 610 may determine a set of parameters and capabilities supported by sink device 612 for use during their communication session as part of a capability negotiation exchange using a RTSP GET_PARAMETER request message 622. According to the dynamic multicast subscription procedure, source device 610 queries sink device 612 for its general interest in multicast data and its available ports using request message 622. For example, as illustrated in FIG. 6, source device 610 requests an indication of interest in receiving multicast media data from sink device 612 using a multicast interested parameter, and requests available ports from sink device 612 using a multicast_ports parameter in request message 622.

Sink device 612 responds to request message 622 with the RTSP GET_PARAMETER response message 624 indicating whether it is generally interested in receiving multicast data and, if interested, providing available port numbers. For example, as illustrated in FIG. 6, sink device 612 indicates interest in receiving multicast media data using the multicast interested parameter set equal to "yes," and indicates available multicast ports using a multicast_ports parameter set equal to port "6000" and range of ports "6100-6200" in response message 624.

Based on RTSP GET_PARAMETER exchange of messages 622, 624, source device 610 may determine the optimal set of parameters to be used for the communication session and perform a RTSP SET_PARAMETER exchange 626 with sink device 612. Exchange 626 may contain the parameter set to be used during the communication session between source device 610 and sink device 612. According to the dynamic multicast subscription procedure, since sink device 612 is interested in receiving multicast media data, source device 610 selects a receiving multicast port number available at sink device 612 for each multicast session available at source device 610. In the case where source device 610 is communicating with more than one sink device, source device 610 may select receiving multicast port numbers for the multicast sessions based on available ports at all the sink devices interested in receiving multicast media data.

Source device 610 then advertises the availability of multicast media data for each of the multicast sessions and the selected multicast port numbers for the multicast sessions to sink device 612 using the RTSP SET_PARAMETER exchange 626. As shown in FIG. 6, source device 610 advertises the availability of multicast media data for a first multicast session using a multicast_presentation1 parameter and for a second multicast session using a multicast_presentation2 parameter in exchange 626. In the illustrated example, the multicast_presentation1 parameter advertises availability of multicast media data on "url1" with a multicast IP address "ip1" and a receiving multicast port number "6120." In addition, the multicast_presentation2 parameter advertises availability of multicast media data on "url2" with a multicast IP address "ip2" and a receiving multicast port number "6150."

Sink device 612 may then request to receive multicast media data for the first multicast session using the RTSP SETUP exchange 628. In the example of FIG. 6, sink device 612 requests to join the first multicast session by performing exchange 628 with source device 610 including the multicast_presentation_url parameter set equal to &H. Sink device 612 binds on the selected multicast IP address (e.g., ip1) and the multicast port number (e.g., 6120) advertised by source device 610 for the first multicast session to receive the multicast media data. Source device 610 then sends a single copy of the multicast media data for the first multicast session to sink device 612 over the session using the selected multicast IP address and the receiving multicast port number. In this case, no play command is needed from sink device 612 to initiate transmission of the multicast media data from source device 610.

Sink device 612 may also request to receive multicast media data for the second multicast session using the RTSP SETUP exchange 630. In the example of FIG. 6, sink device 612 requests to join the second multicast session by performing exchange 630 with source device 610 including the multicast_presentation_url parameter set equal to url2. Sink device 612 binds on the selected multicast IP address (e.g., ip2) and the multicast port number (e.g., 6150) advertised by source device 610 for the second multicast session to receive the multicast media data. Source device 610 then sends a single copy of the multicast media data for the second multicast session to sink device 612 over the session using the selected multicast IP address and the receiving multicast port number. In this case, no play command is needed from sink device 612 to initiate transmission of the multicast media data from source device 610.

In the illustrated example of FIG. 6, after a multicast communication session is established with sink device 612, a new sink device 614 may join the WD system. In order to establish a communication session with sink device 614, source device 610 first performs P2P device discovery and pairing 632 and sink device 614. For example, source device 610, sink device 612, and sink device 614 may form a Wi-Fi P2P group with source device 610 as the group owner.

After source device 610 and sink device 614 establish connectivity, source device 610 may determine a set of parameters and capabilities supported by sink device 614 for use during their communication session as part of a capability negotiation exchange using a RTSP GET_PARAMETER request message 634. According to the dynamic multicast subscription procedure, source device 610 queries sink device 614 for its general interest in multicast data and its available ports using request message 634. Sink device 614 responds to request message 634 with the RTSP GET_PARAMETER response message 636 indicating whether it is generally interested in receiving multicast data and, if interested, providing available port numbers. In the example of FIG. 6, sink device 614 indicates interest in receiving multicast media data using the multicast interested parameter set equal to "yes," and indicates available multicast ports using a multicast_ports parameter set equal to port "6000" and range of ports "6150-6200" in response message 636.

According to the dynamic multicast subscription procedure, since the new sink device 614 is also interested in receiving multicast media data, source device 610 selects a receiving multicast port number available at both sink devices 612 and 614 for each multicast session available at source device 610. In some cases, source device 610 may need to revise the previously selected multicast port numbers for the multicast sessions based on the available ports at the newly joined sink device 614. For example, in FIG. 6, new sink device 614 does not have the selected receiving multicast port number "6120" for the first multicast session available. Source device 610, therefore, revises the selected port number for the first multicast session based on available ports at both sink devices 612 and 614 interested in receiving multicast media data.

In the illustrated example of FIG. 6, source device 610 revises the receiving multicast port number for the first multicast session using blind port revision. In this case, source device 610 revises the selected port number for the first multicast session in order to be available at all the sink devices that are interested in receiving multicast media data, regardless of whether the new sink device 614 is interested in joining the first multicast session.

Once the receiving multicast port number is revised, source device 610 then re-advertises the multicast media data and the selected multicast port numbers for the available multicast sessions to sink device 612 using the RTSP SET_PARAMETER exchange 638. As shown in FIG. 6, source device 610 advertises a revised receiving multicast port number "6160" for the first multicast session in exchange 638 to sink device 612. Upon receipt of the advertisement, sink device 612 needs to modify the port number on which it is bound in order to continue receive the multicast media data for the first multicast session. In this example, sink device 612 instead binds on the revised multicast port number (e.g., 6160) advertised by source device 610 for the first multicast session to receive the multicast media data. In some cases, source device 610 may send the multicast media data for the first multicast session to both the old port number (e.g., 6120) and the new port number (e.g., 6160) for a predetermined period of time.

Source device 610 also advertises the multicast media data and the selected multicast port numbers for the multicast sessions to sink device 614 using the RTSP SET_PARAMETER exchange 640. Sink device 614 may then request to receive multicast media data for the second multicast session using the RTSP SETUP exchange 642. In the example of FIG. 6, sink device 614 requests to join the second multicast session by performing exchange 642 with source device 610 including the multicast_presentation_url parameter set equal to url2. Sink device 614 binds on the selected multicast IP address (e.g., ip2) and the multicast port number (e.g., 6150) advertised by source device 610 for the second multicast session to receive the multicast media data.

Source device 610 then sends a single copy of the multicast media data for the second multicast session to both sink device 612 and sink device 614 over the session using the selected multicast IP address and the receiving multicast port number. In this case, no play command is needed from sink device 612 or sink device 614 to initiate transmission of the multicast media data from source device 610.

Figure 7:
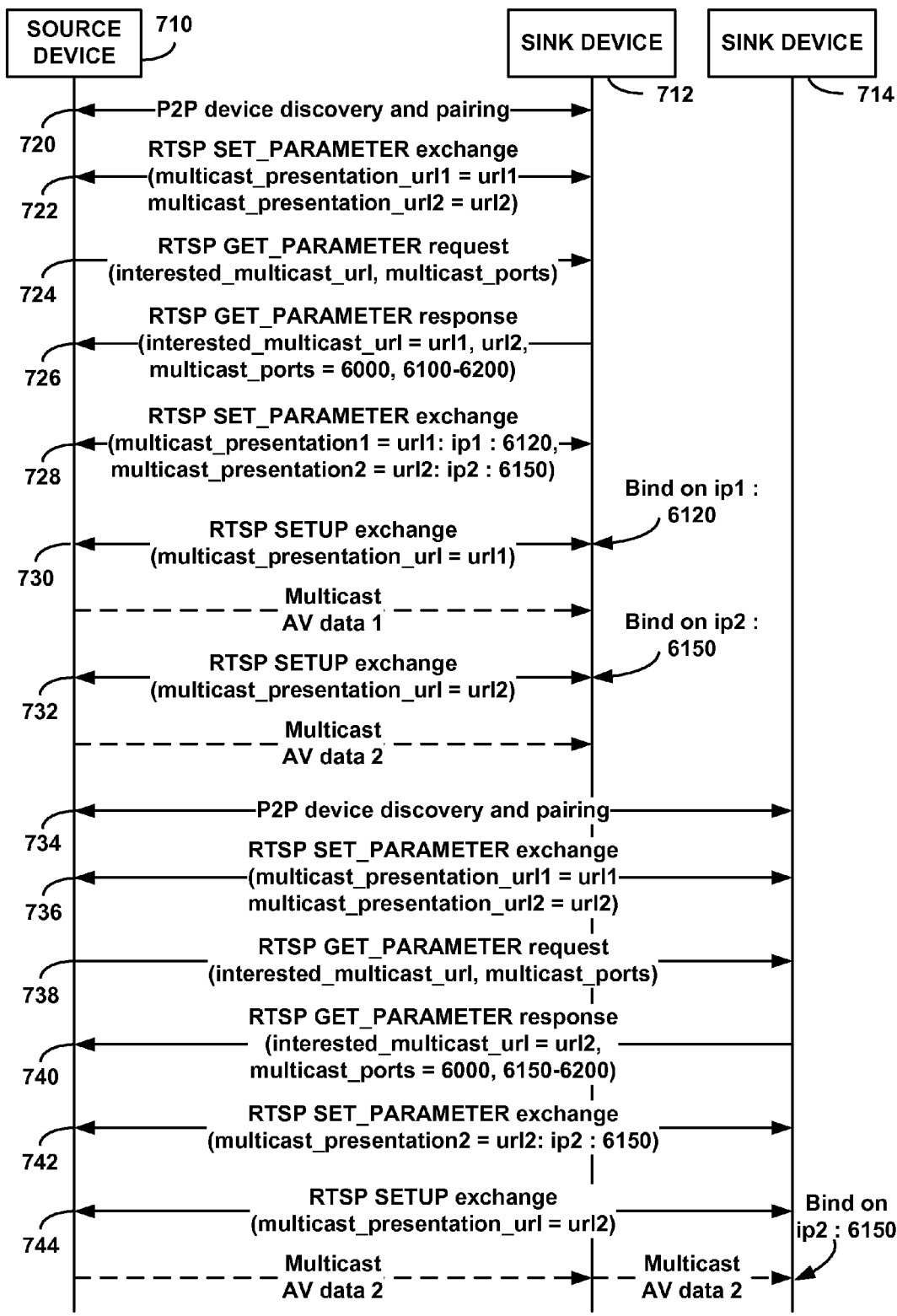
FIG. 7 is a conceptual diagram illustrating an exemplary message transfer sequence for establishing a multicast communication session between a source device and two sink devices using a dynamic multicast subscription procedure with informed port revision.

FIG. 7 is a conceptual diagram illustrating an exemplary message transfer sequence for establishing a multicast communication session between a source device 710 and two sink devices 712, 714 using a dynamic multicast subscription procedure with informed port revision. Source device 710 may generally operate in the same manner described above for source device 120 of FIGS. 1A & 1B and source device 220 of FIG. 2. Sink devices 712 and 714 may generally operate in the same manner described above for sink device 160 of FIGS. 1A & 1B and sink device 360 of FIG. 3.

In the illustrated example of FIG. 7, in order to establish a communication session with sink device 712, source device 710 first performs P2P device discovery and pairing 720 and sink device 712. After source device 710 and sink device 712 establish connectivity, source device 710 may determine parameters to be used for identifying the available multicast sessions in a first RTSP SET_PARAMETER exchange 722 with sink device 712.

According to the dynamic multicast subscription procedure, source device 710 advertises the availability of multicast media data for a first multicast session and a second multicast session to sink device 712 using exchange 722. For example, as illustrated in FIG. 7, source device 710 advertises the availability of multicast media data to sink device 712 using a multicast_presentation_url1 parameter set equal to "url1" and a multicast_presentation_url2 parameter set equal to "url2" in exchange 722.

Source device 710 may then determine a set of parameters and capabilities supported by sink device 712 for use during their communication session as part of a capability negotiation exchange using a RTSP GET_PARAMETER request message 724. According to the dynamic multicast subscription procedure, source device 710 queries sink device 712 for its interest in multicast data for the previously advertised multicast sessions and its available ports using request message 724. For example, as illustrated in FIG. 7, source device 710 requests an indication of interest in receiving multicast media data for a specific multicast session from sink device 712 using a interested_multicast_url parameter, and requests available ports from sink device 712 using a multicast_ports parameter in request message 724.

Sink device 712 responds to request message 724 with the RTSP GET_PARAMETER response message 726 indicating the specific multicast sessions from which it is interested in receiving multicast data and, if interested, providing available port numbers. For example, as illustrated in FIG. 7, sink device 712 indicates interest in receiving multicast media data for both the first and second multicast sessions using the interested_multicast_url parameter set equal to "url1" and "url2," and indicates available multicast ports using the multicast_ports parameter set equal to port "6000" and range of ports "6100-6200" in response message 726.

Based on RTSP GET_PARAMETER exchange of messages 724, 726, source device 710 may determine the optimal set of parameters to be used for the communication session and perform a second RTSP SET_PARAMETER exchange 728 with sink device 712. Exchange 728 may contain the parameter set to be used during the communication session between source device 710 and sink device 712. According to the dynamic multicast subscription procedure, since sink device 712 is interested in receiving multicast media data for the first and second multicast sessions, source device 710 selects a receiving multicast port number available at sink device 712 for both the first and second multicast session. In the case where source device 710 is communicating with more than one sink device, source device 710 may select a receiving multicast port number for each of the multicast sessions based on available ports at all the sink devices interested in receiving multicast media data for the particular multicast session.

Source device 710 then advertises the availability of multicast media data for the first and second multicast sessions in which sink device 712 is interested and the selected multicast port numbers for the multicast sessions to sink device 712 using the RTSP SET_PARAMETER exchange 728. As shown in FIG. 7, source device 710 advertises the availability of multicast media data for the first multicast session using a multicast_presentation1 parameter and for the second multicast session using a multicast_presentation2 parameter in exchange 728. In the illustrated example, the multicast_presentation1 parameter advertises availability of multicast media data on "url1" with a multicast IP address "ip1" and a receiving multicast port number "6120." In addition, the multicast_presentation2 parameter advertises availability of multicast media data on "url2" with a multicast IP address "ip2" and a receiving multicast port number "6150."

Sink device 712 may then request to receive multicast media data for the first multicast session using the RTSP SETUP exchange 730. In the example of FIG. 7, sink device 712 requests to join the first multicast session by performing exchange 730 with source device 710 including the multicast_presentation_url parameter set equal to url1. Sink device 712 binds on the selected multicast IP address (e.g., ip1) and the multicast port number (e.g., 6120) advertised by source device 710 for the first multicast session to receive the multicast media data. Source device 710 then sends a single copy of the multicast media data for the first multicast session to sink device 712 over the session using the selected multicast IP address and the receiving multicast port number. In this case, no play command is needed from sink device 712 to initiate transmission of the multicast media data from source device 710.

Sink device 712 may also request to receive multicast media data for the second multicast session using the RTSP SETUP exchange 732. In the example of FIG. 7, sink device 712 requests to join the second multicast session by performing exchange 732 with source device 710 including the multicast_presentation_url parameter set equal to url2. Sink device 712 binds on the selected multicast IP address (e.g., ip2) and the multicast port number (e.g., 6150) advertised by source device 710 for the second multicast session to receive the multicast media data. Source device 710 then sends a single copy of the multicast media data for the second multicast session to sink device 712 over the session using the selected multicast IP address and the receiving multicast port number. In this case, no play command is needed from sink device 712 to initiate transmission of the multicast media data from source device 710.

In the illustrated example of FIG. 7, after a multicast communication session is established with sink device 712, a new sink device 714 may join the WD system. In order to establish a communication session with sink device 714, source device 710 first performs P2P device discovery and pairing 734 and sink device 714. For example, source device 710, sink device 712, and sink device 714 may form a Wi-Fi P2P group with source device 710 as the group owner.

After source device 710 and sink device 714 establish connectivity, source device 710 may determine parameters to be used for identifying the available multicast sessions in a first RTSP SET_PARAMETER exchange 736 with sink device 714. According to the dynamic multicast subscription procedure, source device 710 advertises the availability of multicast media data for the first multicast session and the second multicast session to sink device 714 using exchange 736. Source device 710 may then determine a set of parameters and capabilities supported by sink device 714 for use during their communication session as part of a capability negotiation exchange using a RTSP GET_PARAMETER request message 738. According to the dynamic multicast subscription procedure, source device 710 queries sink device 714 for its interest in multicast data for the previously advertised multicast sessions and its available ports using request message 738.

Sink device 714 responds to request message 738 with the RTSP GET_PARAMETER response message 740 indicating the specific multicast sessions from which it is interested in receiving multicast data and, if interested, providing available port numbers. For example, as illustrated in FIG. 7, sink device 714 indicates interest in receiving multicast media data for the second multicast sessions using the interested_multicast_url parameter set equal to "url2," and indicates available multicast ports using the multicast_ports parameter set equal to port "6000" and range of ports "6150-6200" in response message 740.

According to the dynamic multicast subscription procedure, since the new sink device 714 is also interested in receiving multicast media data for the second multicast session, source device 710 selects a receiving multicast port number available at both sink devices 712 and 714 for the second multicast session. In some cases, source device 710 may need to revise the previously selected multicast port numbers for the multicast sessions based on the available ports at the newly joined sink device 714. For example, in FIG. 7, new sink device 714 does not have the selected receiving multicast port number "6120" for the first multicast session available. New sink device 714 has not, however, indicated interest in joining the first multicast session. Source device 710, therefore, does not need to revise the selected port number for the first multicast session.

Source device 710 then advertises the availability of multicast media data for the second multicast session in which sink device 714 is interested and the selected multicast port number for the second multicast session to sink device 714 using the RTSP SET_PARAMETER exchange 742. Sink device 714 may then request to receive multicast media data for the second multicast session using the RTSP SETUP exchange 744. In the example of FIG. 7, sink device 714 requests to join the second multicast session by performing exchange 744 with source device 710 including the multicast_presentation_url parameter set equal to url2. Sink device 714 binds on the selected multicast IP address (e.g., ip2) and the multicast port number (e.g., 6150) advertised by source device 710 for the second multicast session to receive the multicast media data. Source device 710 then sends a single copy of the multicast media data for the second multicast session to both sink device 712 and sink device 714 over the session using the selected multicast IP address and the receiving multicast port number. In this case, no play command is needed from sink device 712 or sink device 714 to initiate transmission of the multicast media data for source device 710.

Figure 8:
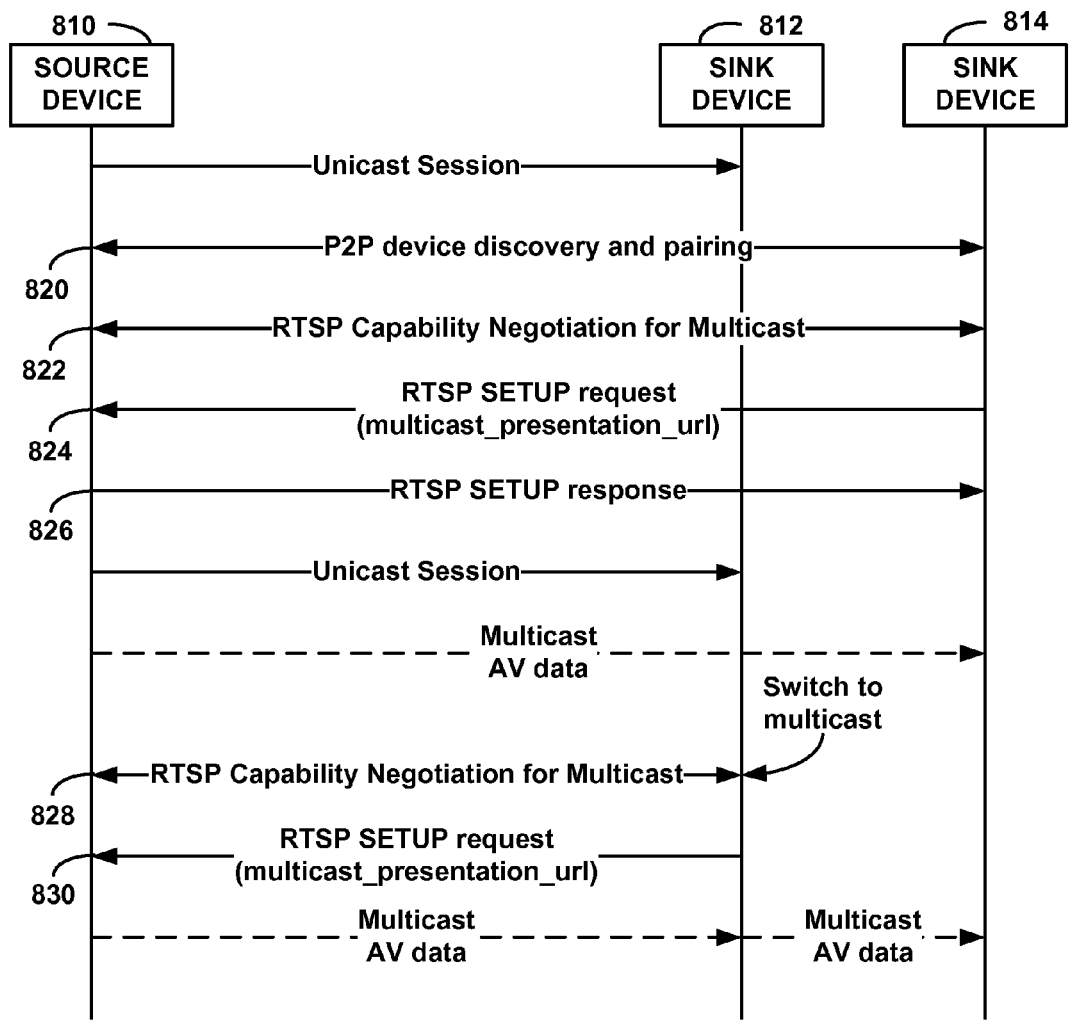
FIG. 8 is a conceptual diagram illustrating an exemplary message transfer sequence for converting a unicast communication session between a source device and one sink device to a multicast communication session between the source device and two sink devices.

FIG. 8 is a conceptual diagram illustrating an exemplary message transfer sequence for converting a unicast communication session between a source device 810 and one sink device 812 to a multicast communication session between source device 810 and two sink devices 812, 814. Source device 810 may generally operate in the same manner described above for source device 120 of FIGS. 1A & 1B and source device 220 of FIG. 2. Sink devices 812 and 814 may generally operate in the same manner described above for sink device 160 of FIGS. 1A & 1B and sink device 360 of FIG. 3.

In the illustrated example of FIG. 8, source device 810 has already established a unicast session with sink device 812. After the unicast session is established with sink device 812, a new sink device 814 may join the WD system. In order to communicate with new sink device 814, source device 810 and sink device 814 perform P2P device discovery and pairing 820. After source device 810 and sink device 814 establish connectivity, source device 810 and sink device 814 may determine a set of parameters and capabilities for a multicast communication session as part of a RTSP Capability Negotiation for Multicast exchange 822.

Source device 810 may perform one of the multicast subscription procedures described above with new sink device 814. According to the multicast subscription procedure, source device 810 advertises the availability of multicast media data for a multicast session to sink device 814. Sink device 814 may then request to receive the advertised multicast media data using the RTSP SETUP request message 824. In the example of FIG. 8, sink device 814 requests to join the multicast session by sending request message 824 to source device 810 including a multicast_presentation_url parameter.

Upon receipt of request message 824, source device 810 responds with the RTSP SETUP response message 826 including an RTSP status code indicating whether adding sink device 814 to the multicast session was successful. In the case of the static multicast subscription procedure, the WFD specification provides a predefined multicast port number for the multicast session to sink device 814. In the case of the dynamic multicast subscription procedure, source device 810 selects a multicast port number for the multicast session based on available port numbers at sink device 814. In either case, source device 810 then sends a single copy of the multicast media data for the multicast session to sink device 814 over the session using the multicast port number.

As illustrated in FIG. 8, source device 810 sends the multicast media data to sink device 814 while continuing to send the unicast media data to sink device 812. According to the techniques, source device 810 then performs the multicast subscription procedure with the sink device 812. For example, in FIG. 8, source device 810 and sink device 812 may determine a set of parameters and capabilities for a multicast communication session as part of a RTSP Capability Negotiation for Multicast exchange 828.

Source device 810 may perform the multicast subscription procedure with sink device 812 to determine if sink device 812 is interested in receiving multicast media data. Sink device 812 may then request to receive the advertised multicast media data using the RTSP SETUP request message 830. In the example of FIG. 8, sink device 812 requests to join the multicast session by sending request message 830 to source device 810 including a multicast_presentation_url parameter. Source device 810 then sends a single copy of the multicast media data for the multicast session to both sink device 812 and sink device 814 over the session using the multicast port number. Once sink device 812 joins the multicast session, source device 810 discontinues the unicast session.

Figure 9:
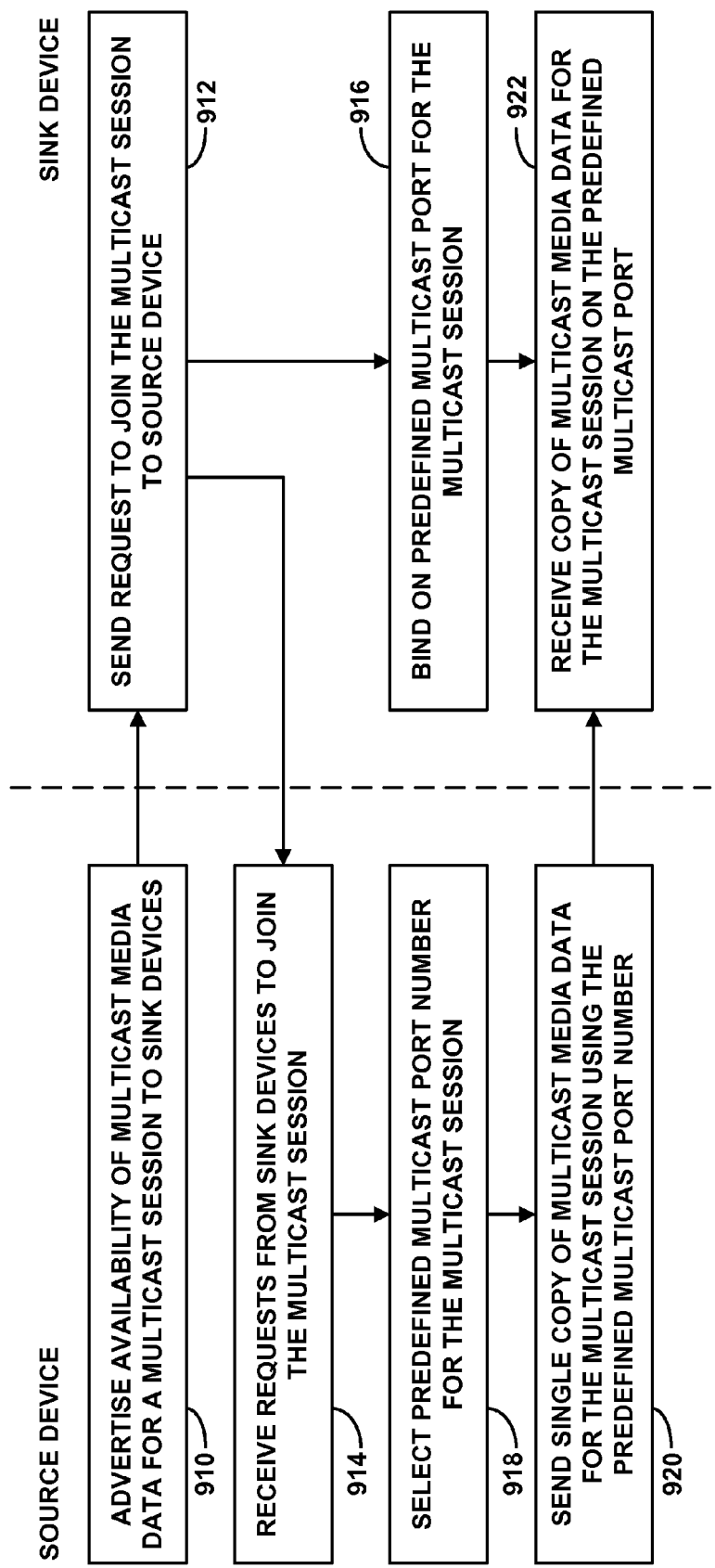
FIG. 9 is a flowchart illustrating an exemplary operation of a static multicast subscription procedure by a source device and a sink device in a WD system.

FIG. 9 is a flowchart illustrating an exemplary operation of a static multicast subscription procedure by a source device and a sink device in a WD system. The operation is described herein with respect to source device 220 of FIG. 2 and sink device 360 of FIG. 3. In other examples, any of the source device and sink devices described in this disclosure may perform the exemplary operation.

According to the static multicast subscription procedure, source device 220 uses a RTSP capability negotiation phase of the WD communication session setup to establish a multicast communication session with sink device 360 and one or more additional sink devices in the WD system. More specifically, source device 220 advertises availability of multicast media data for a multicast session to sink device 360 (910). Source device 220 advertises the availability of media data to the sink devices using RTSP, e.g., using the RTSP SET_PARAMETER request. If interested in receiving the advertised multicast media data, sink device 360 may then send a request to join the multicast session to source device 220 (912). Sink device 360 may request the multicast media data, e.g., using the RTSP SETUP request. Source device 220 receives requests to join the multicast session from sink device 360 and any other interested sink devices in the WD system (914).

The WFD specification provides a well-known, predefined multicast IP port and receiving multicast port number. Both source device 220 and sink device 360, therefore, are aware of the predefined multicast port number to be used for receiving multicast media data in the WD system. Sink device 360, and any other sink devices interested in receiving the advertised multicast media data, binds on the predefined multicast port number for the multicast session (916). In addition, source device 220 selects the predefined multicast port number for the multicast session (918). Source device 220 then sends a single copy of the multicast media data for the multicast session to sink device 360 and any other interested sink devices, using the predefined multicast port number (920). Sink device 360 receives a copy of the multicast media data for the multicast session on the predefined multicast port to which it is bound (922).

Figure 10:
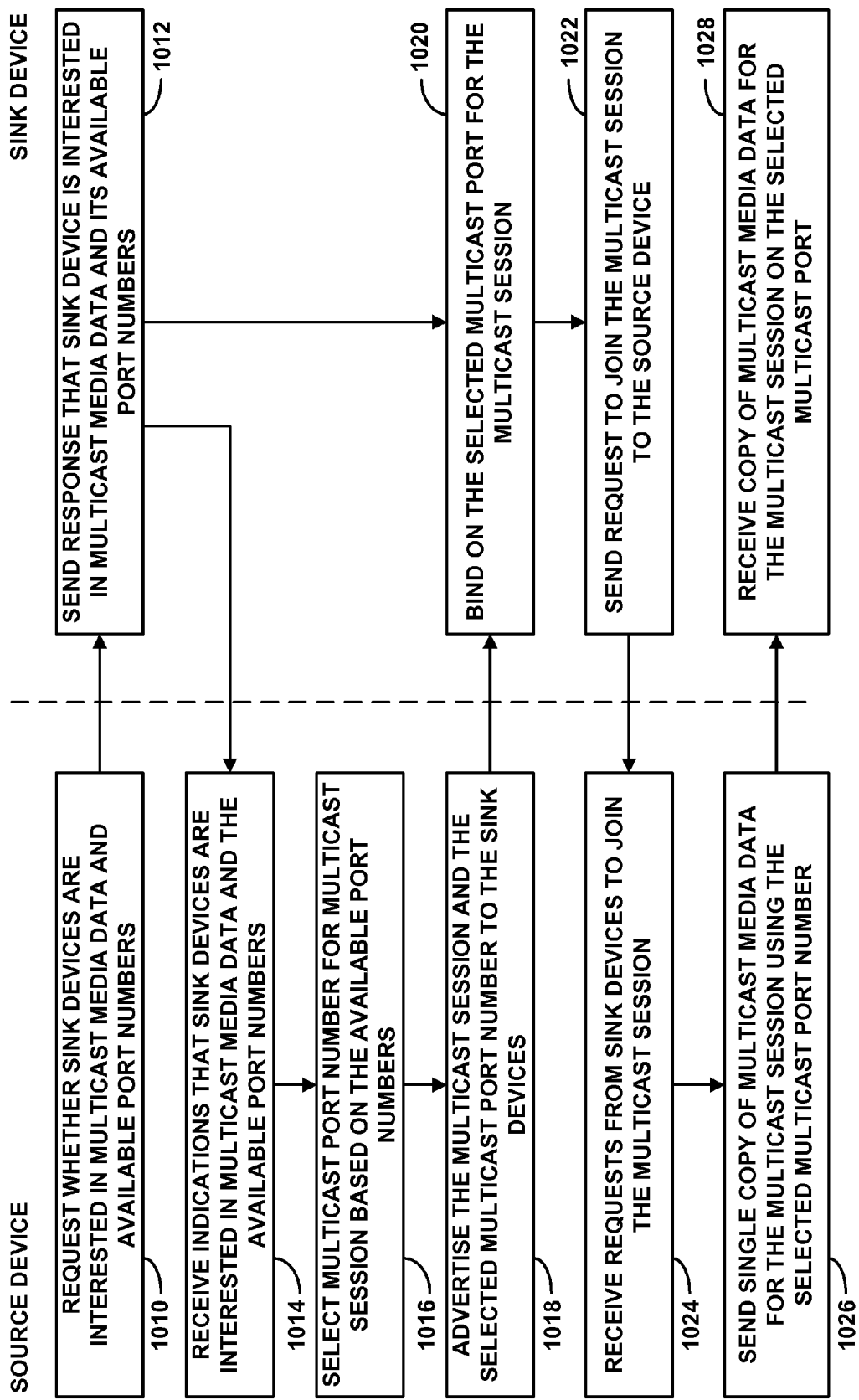
FIG. 10 is a flowchart illustrating an exemplary operation of a dynamic multicast subscription procedure by a source device and a sink device in a WD system.

FIG. 10 is a flowchart illustrating an exemplary operation of a dynamic multicast subscription procedure by a source device and a sink device in a WD system. The operation is described herein with respect to source device 220 of FIG. 2 and sink device 360 of FIG. 3. In other examples, any of the source device and sink devices described in this disclosure may perform the exemplary operation.

According to the dynamic multicast subscription procedure, source device 220 uses a RTSP capability negotiation phase of the WD communication session setup to establish a multicast communication session with sink device 360 and one or more additional sink devices in the WD system, and to select the multicast port number for the multicast session. Unlike the static multicast subscription procedures described above, the dynamic multicast subscription procedure enables source device 220 to select the multicast port number for a multicast session based on available port numbers of the interested sink devices.

Source device 220 requests whether sink device 360 is interested in multicast media data and requests the available port numbers at sink device 360 (1010). Source device 220 queries sink device 360 and any other sink device in the WD system using RTSP, e.g., using the RTSP GET_PARAMETER request. In the case of the dynamic multicast subscription procedure with blind port revision, source device 220 queries the sink devices for general interest in multicast media data and port numbers. In the case of the dynamic multicast subscription procedure with informed port revision, source device 220 queries the sink devices for interest in multicast media data for specific multicast sessions. If interested in receiving multicast media data, sink device 360 may then send a response indicating that it is interested in receiving multicast media data and providing its available multicast port numbers to source device 220 (1012).

Source device 220 receives indications that sink device 360, and any other interested sink devices in the WD system, are interested in receiving multicast media data and the available port numbers at each of the sink devices (1014). Source device 220 then selects a multicast port number for the multicast session based on the available ports numbers at the interested sink devices (1016). In the case of the dynamic multicast subscription procedure with blind port revision, source device 220 selects a multicast port number for each of the multicast sessions based on the available ports numbers at all of the sink devices that are generally interested in receiving multicast media data. In the case of the dynamic multicast subscription procedure with informed port revision, source device 220 selects a multicast port number for each of the multicast sessions based on the available ports numbers at the sink devices that are interested in the specific multicast session.

Source device 220 then advertises the availability of multicast media data for each of the multicast sessions and the selected multicast port number for the multicast session to the sink devices (1018). Source device 220 advertises the multicast media data and multicast port numbers to the sink devices using RTSP, e.g., using the RTSP SET_PARAMETER request. If interested in receiving the advertised multicast media data, sink device 360, and any other sink devices interested in receiving the advertised multicast media data, binds on the selected multicast port number for the multicast session (1020). In addition, sink device 360 sends a request to join the multicast session to source device 220 (1022). Sink device 360 may request the multicast media data, e.g., using the RTSP SETUP request.

Source device 220 receives requests to join the multicast session from sink device 360 and any other interested sink devices in the WD system (1024). Source device 220 then sends a single copy of the multicast media data for the multicast session to sink device 360 and any other interested sink devices, using the predefined multicast port number (1026). Sink device 360 receives a copy of the multicast media data for the multicast session on the selected multicast port to which it is bound (1028).

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. In some examples, computer-readable media may comprise non-transitory computer-readable media. Data storage media may be any available media that can be accessed by one or more computers or one or more processors to retrieve instructions, code and/or data structures for implementation of the techniques described in this disclosure.

By way of example, and not limitation, such computer-readable media can comprise non-transitory media such as RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various embodiments of the invention have been described. These and other embodiments are within the scope of the following claims.

What is claimed is:

1. A method comprising:
    establishing one or more multicast communication sessions between a source device and two or more sink devices in a Wireless Display (WD) system, including advertising availability of multicast media data for the multicast sessions and receiving requests from the sink devices to join the multicast sessions;
    receiving, at the source device, a signal from each of the two or more sink devices indicating available port numbers at the sink devices;
    selecting, with the source device, a receiving multicast port number for each of the multicast sessions based on the available port numbers at the sink devices;
    advertising the selected receiving multicast port number for each of the multicast sessions to the sink devices; and
    sending a single copy of the multicast media data for each of the multicast sessions to the sink devices using the selected receiving multicast port number.

2. The method of claim 1, further comprising, in response to a request from the source device during a capability negotiation phase in the WD system, receiving the signal at the source device from each of the sink devices indicating that the particular sink device is interested in receiving the multicast media data for any of the multicast sessions and indicating the port numbers that are available at the sink device, wherein selecting the receiving multicast port number comprises selecting the receiving multicast port number for each of the multicast sessions based on the available port numbers at all the sink devices.

3. The method of claim 2, further comprising:
    receiving a signal from a new sink device indicating that the new sink device is interested in receiving the multicast media data for any of the multicast sessions and indicating port numbers that are available at the new sink device; and
    when the selected receiving multicast port number for at least one of the multicast sessions is not available at the new sink device, revising the selected receiving multicast port number for the one of the multicast sessions based on the available port numbers at all the sink devices, including the new sink device, regardless of whether the new sink device is interested in joining the one of the multicast sessions.

4. The method of claim 1, further comprising, in response to a request from the source device during a capability negotiation phase in the WD system, receiving the signal at the source device from each of the sink devices indicating that the particular sink device is interested in receiving the multicast media data for one or more particular multicast sessions and indicating the port numbers that are available at the sink device, wherein selecting the receiving multicast port number comprises selecting the receiving multicast port number for each of the multicast sessions based on the available port numbers at the sink devices that are interested in the particular multicast session.

5. The method of claim 4, further comprising:
receiving a signal from a new sink device indicating that the new sink device is interested in receiving the multicast media data for the one or more particular multicast sessions and indicating port numbers that are available at the new sink device; and
when the selected receiving multicast port number for at least one of the multicast sessions is not available at the new sink device and the new sink device is interested in the one of the multicast sessions, revising the selected receiving multicast port number for the one of the multicast sessions based on the available port numbers at the sink devices that are interested in the particular multicast session, including the new sink device.

6. The method of claim 1, wherein establishing the multicast sessions comprises
establishing a communication channel between the source device and each of the sink devices for a multicast subscription protocol; and
establishing the multicast sessions using the multicast subscription protocol over the communication channel.

7. The method of claim 1, further comprising:
establishing a unicast communication session between the source device and a first sink device in the WD system;
establishing a multicast communication session between the source device and a new sink device; and
converting the unicast session between the source device and the first sink device to the multicast session.

8. A method comprising:
establishing, with a sink device, one or more multicast communication sessions with a source device in a Wireless Display (WD) system, including receiving advertisements of multicast media data for the multicast sessions from the source device and sending requests to the source device to join one or more of the multicast sessions;
sending, from the sink device to the source device, a signal indicating available port numbers at the sink device;
receiving an advertisement of a selected receiving multicast port number for each of the multicast sessions from the source device, wherein the source device selects the receiving multicast port number for each of the multicast sessions based on the available port numbers at the sink device;
binding, with the sink device, on the selected receiving multicast port number for at least one of the multicast sessions in which the sink device is interested in joining; and
receiving, with the sink device, a copy of the multicast media data for the one of the multicast sessions on the selected receiving multicast port number to which the sink device is bound.

9. The method of claim 8, further comprising, in response to a request from the source device during a capability negotiation phase in the WD system, sending the signal to the source device indicating that the sink device is interested in receiving the multicast media data for any of the multicast sessions and indicating the port numbers that are available at the sink device.

10. The method of claim 9, further comprising, when the selected receiving multicast port number for the one of the multicast sessions is not available at a new sink device, receiving an advertisement of a revised selected receiving multicast port number for the one of the multicast sessions based on the available port numbers at all the sink devices, including the new sink device, regardless of whether the new sink device is interested in joining the one of the multicast sessions.

11. The method of claim 8, further comprising, in response to a request from the source device during a capability negotiation phase in the WD system, sending the signal to the source device indicating that the sink device is interested in receiving the multicast media data for one or more particular multicast sessions and indicating the port numbers that are available at the sink device.

12. The method of claim 11, further comprising, when the selected receiving multicast port number for the one of the multicast sessions is not available at a new sink device and the new sink device is interested in joining the one of the multicast sessions, receiving an advertisement of a revised selected receiving multicast port number for the one of the multicast sessions based on the available port numbers at the sink devices that are interested in the one of the multicast sessions, including the sink device and the new sink device.

13. The method of claim 8, wherein establishing the multicast sessions comprises:
establishing a communication channel between the source device and each of the sink devices for a multicast subscription protocol; and
establishing the multicast sessions using the multicast subscription protocol over the communication channel.

14. The method of claim 8, further comprising:
establishing a unicast communication session between the source device and the sink device in the WD system; and
converting the unicast session between the source device and the sink device to a multicast communication session upon establishment of the multicast session between the source device and a new sink device in the WD system.

15. A source device comprising:
a memory that stores media data; and
a processor configured to establish one or more multicast communication sessions between a source device and two or more sink devices in a Wireless Display (WD) system, including advertising availability of multicast media data for the multicast sessions and receiving requests from the sink devices to join the multicast sessions, receive a signal from each of the two or more sink devices indicating available port numbers at the sink devices, select a receiving multicast port number for each of the multicast sessions based on the available port numbers at the sink devices, advertise the selected receiving multicast port number for each of the multicast sessions to the sink devices, and send a single copy of the multicast media data for each of the multicast sessions to the sink devices using the selected receiving multicast port number.

16. The source device of claim 15, wherein, in response to a request from the source device during a capability negotiation phase in the WD system, the processor:
receives the signal at the source device from each of the sink devices indicating that the particular sink device is interested in receiving the multicast media data for any of the multicast sessions and indicating the port numbers that are available at the sink device; and
selects the receiving multicast port number for each of the multicast sessions based on the available port numbers at all the sink devices.

17. The source device of claim 16, wherein the processor:
receives a signal from a new sink device indicating that the new sink device is interested in receiving the multicast media data for any of the multicast sessions and indicating port numbers that are available at the new sink device; and when the selected receiving multicast port number for at least one of the multicast sessions is not available at the new sink device, revises the selected receiving multicast port number for the one of the multicast sessions based on the available port numbers at all the sink devices, including the new sink device, regardless of whether the new sink device is interested in joining the one of the multicast sessions.

18. The source device of claim 15, wherein, in response to a request from the source device during a capability negotiation phase in the WD system, the processor:

receives the signal at the source device from each of the sink devices indicating that the particular sink device is interested in receiving the multicast media data for one or more particular multicast sessions and indicating the port numbers that are available at the sink device; and selects the receiving multicast port number for each of the multicast sessions based on the available port numbers at the sink devices that are interested in the particular multicast session.

19. The source device of claim 18, wherein the processor:

receives a signal from a new sink device indicating that the new sink device is interested in receiving the multicast media data for the one or more particular multicast sessions and indicating port numbers that are available at the new sink device; and when the selected receiving multicast port number for at least one of the multicast sessions is not available at the new sink device and the new sink device is interested in the one of the multicast sessions, revises the selected receiving multicast port number for the one of the multicast sessions based on the available port numbers at the sink devices that are interested in the particular multicast session, including the new sink device.

20. The source device of claim 15, wherein, during a capability negotiation phase in the WD system, the processor:

establishes a communication channel between the source device and each of the sink devices for a multicast subscription protocol; and establishes the multicast sessions using the multicast subscription protocol over the communication channel.

21. The source device of claim 15, wherein the processor:

establishes a unicast communication session between the source device and a first sink device in the WD system;

establishes a multicast communication session between the source device and a new sink device; and converts the unicast session between the source device and the first sink device to the multicast session.

22. A sink device comprising:

a memory that stores media data; and a processor configured to establish one or more multicast communication sessions with a source device in a Wireless Display (WD) system, including receiving advertisements of multicast media data for the multicast sessions from the source device and sending requests to the source device to join one or more of the multicast sessions, send a signal to the source device indicating available port numbers at the sink device, receive an advertisement of a selected receiving multicast port number for each of the multicast sessions from the source device, wherein the source device selects the receiving multicast port number for each of the multicast sessions based on the available port numbers at the sink device, bind on the selected receiving multicast port number for at least one the multicast sessions in which the sink device is interested in joining, and receive a copy of the multicast media data for the one of the multicast sessions on the selected receiving multicast port number to which the sink device is bound.

23. The sink device of claim 22, wherein, in response to a request from the source device during a capability negotiation phase in the WD system, the processor sends the signal to the source device indicating that the sink device is interested in receiving the multicast media data for any of the multicast sessions and indicating the port numbers that are available at the sink device.

24. The sink device of claim 23, wherein, when the selected receiving multicast port number for the one of the multicast sessions is not available at a new sink device, the processor receives an advertisement of a revised selected receiving multicast port number for the one of the multicast sessions based on the available port numbers at all the sink devices, including the new sink device, regardless of whether the new sink device is interested in joining the one of the multicast sessions.

25. The sink device of claim 22, wherein, in response to a request from the source device during a capability negotiation phase in the WD system, the processor sends the signal to the source device indicating that the sink device is interested in receiving the multicast media data for one or more particular multicast sessions and indicating the port numbers that are available at the sink device.

26. The sink device of claim 25, wherein, when the selected receiving multicast port number for the one of the multicast sessions is not available at a new sink device and the new sink device is interested in joining the one of the multicast sessions, the processor receives an advertisement of a revised selected receiving multicast port number for the one of the multicast sessions based on the available port numbers at the sink devices that are interested in the one of the multicast sessions, including the sink device and the new sink device.

27. The sink device of claim 22, wherein the processor:

establishes a communication channel between the source device and each of the sink devices for a multicast subscription protocol; and establishes the multicast sessions using the multicast subscription protocol over the communication channel.

28. The sink device of claim 22, wherein the processor:

establishes a unicast communication session between the source device and the sink device in the WD system; and converts the unicast session between the source device and the sink device to a multicast communication session upon establishment of the multicast session between the source device and a new sink device in the WD system.

29. A source device comprising:

means for establishing one or more multicast communication sessions between a source device and two or more sink devices in a Wireless Display (WD) system, including advertising availability of multicast media data for the multicast sessions and receiving requests from the sink devices to join the multicast sessions;

means for receiving a signal from each of the two or more sink devices indicating available port numbers at the sink devices;

means for selecting a receiving multicast port number for each of the multicast sessions based on the available port numbers at the sink devices;

means for advertising the selected receiving multicast port number for each of the multicast sessions to the sink devices; and means for sending a single copy of the multicast media data for each of the multicast sessions to the sink devices using the selected receiving multicast port number.

30. The source device of claim 29, further comprising:
means for, in response to a request from the source device during a capability negotiation phase in the WD system, receiving the signal at the source device from each of the sink devices indicating that the particular sink device is interested in receiving the multicast media data for any of the multicast sessions and indicating the port numbers that are available at the sink device; and
means for selecting the receiving multicast port number for each of the multicast sessions based on the available port numbers at all the sink devices.

31. The source device of claim 29, further comprising:
means for, in response to a request from the source device during a capability negotiation phase in the WD system, receiving the signal at the source device from each of the sink devices indicating that the particular sink device is interested in receiving the multicast media data for one or more particular multicast sessions and indicating the port numbers that are available at the sink device; and
means for selecting the receiving multicast port number for each of the multicast sessions based on the available port numbers at the sink devices that are interested in the particular multicast session.

32. The source device of claim 29, further comprising:
means for establishing a unicast communication session between the source device and a first sink device in the WD system;
means for establishing a multicast communication session between the source device and a new sink device; and
means for converting the unicast session between the source device and the first sink device to the multicast session.

33. A sink device comprising:
means for establishing one or more multicast communication sessions with a source device in a Wireless Display (WD) system, including receiving advertisements of multicast media data for the multicast sessions from the source device and sending requests to the source device to join one or more of the multicast sessions;
means for sending a signal to the source device indicating available port numbers at the sink device;
means for receiving an advertisement of a selected receiving multicast port number for each of the multicast sessions from the source device, wherein the source device selects the receiving multicast port number for each of the multicast sessions based on the available port numbers at the sink device;
means for binding on the selected receiving multicast port number for at least one of the multicast sessions in which the sink device is interested in joining; and
means for receiving a copy of the multicast media data for the one of the multicast sessions on the selected receiving multicast port number to which the sink device is bound.

34. The sink device of claim 33, further comprising means for, in response to a request from the source device during a capability negotiation phase in the WD system, sending the signal to the source device indicating that the sink device is interested in receiving the multicast media data for any of the multicast sessions and indicating the port numbers that are available at the sink device.

35. The sink device of claim 33, further comprising means for, in response to a request from the source device during a capability negotiation phase in the WD system, sending the signal to the source device indicating that the sink device is interested in receiving the multicast media data for one or more particular multicast sessions and indicating the port numbers that are available at the sink device.

36. The sink device of claim 33, further comprising:
means for establishing a unicast communication session between the source device and the sink device in the WD system; and
means for converting the unicast session between the source device and the sink device to a multicast communication session upon establishment of the multicast session between the source device and a new sink device in the WD system.

37. A non-transitory computer-readable medium comprising instructions that when executed in a source device cause a programmable processor to:
establish one or more multicast communication sessions between the source device and two or more sink devices in a Wireless Display (WD) system, including advertising availability of multicast media data for the multicast sessions and receiving requests from the sink devices to join the multicast sessions;
receive, at the source device, a signal from each of the two or more sink devices indicating available port numbers at the sink devices;
select, with the source device, a receiving multicast port number for each of the multicast sessions based on the available port numbers at the sink devices;
advertise the selected receiving multicast port number for each of the multicast sessions to the sink devices; and
send a single copy of the multicast media data for each of the multicast sessions to the sink devices using the selected receiving multicast port number.

38. A non-transitory computer-readable medium comprising instructions that when executed in a sink device cause a programmable processor to:
establish, with the sink device, one or more multicast communication sessions with a source device in a Wireless Display (WD) system, including receiving advertisements of multicast media data for the multicast sessions from the source device and sending requests to the source device to join one or more of the multicast sessions;
send, from the sink device to the source device, a signal indicating available port numbers at the sink device;
receive, at the sink device, an advertisement of a selected receiving multicast port number for each of the multicast sessions from the source device, wherein the source device selects the receiving multicast port number for each of the multicast sessions based on the available port numbers at the sink device;
bind, with the sink device, on the selected receiving multicast port number for at least one of the multicast sessions in which the sink device is interested in joining; and
receive, with the sink device, a copy of the multicast media data for the one of the multicast sessions on the selected receiving multicast port number to which the sink device is bound.

\* \* \* \* \*